United States Patent [19]
Nakasaka et al.

[11] Patent Number: 5,995,505
[45] Date of Patent: Nov. 30, 1999

[54] MATRIX SWITCHER

[75] Inventors: Chikatomo Nakasaka; Hiroyuki Sugimoto, both of Kanagawa, Japan

[73] Assignee: Sony Corporation, Tokyo, Japan

[21] Appl. No.: 08/973,665

[22] PCT Filed: Apr. 17, 1997

[86] PCT No.: PCT/JP97/01325

§ 371 Date: May 1, 1998

§ 102(e) Date: May 1, 1998

[87] PCT Pub. No.: WO97/39574

PCT Pub. Date: Oct. 23, 1997

[30] Foreign Application Priority Data

Apr. 17, 1996 [JP] Japan .................................. 8-119694

[51] Int. Cl.⁶ ........................... H04L 12/50; H04Q 19/00
[52] U.S. Cl. .................................. 370/360; 340/825.79
[58] Field of Search ................................ 370/360, 380, 370/386, 387, 388; 340/825.79, 825.8; 348/705, 706

[56] References Cited

U.S. PATENT DOCUMENTS

| | | | |
|---|---|---|---|
| 4,977,449 | 12/1990 | Morgan | 348/8 |
| 5,276,445 | 1/1994 | Mita | 340/825.79 |
| 5,343,193 | 8/1994 | Shoda | 340/825.79 |
| 5,530,434 | 6/1996 | Kanda | 340/825.79 |
| 5,568,204 | 10/1996 | Takamori | 348/705 |
| 5,686,905 | 11/1997 | Murate | 340/825.79 |
| 5,754,254 | 5/1998 | Kobayashi | 348/705 |
| 5,754,255 | 5/1998 | Takamori | 348/705 |

FOREIGN PATENT DOCUMENTS

| | | |
|---|---|---|
| 61-182378 | 8/1986 | Japan . |
| 64-1026 | 1/1989 | Japan . |
| 2-164123 | 6/1990 | Japan . |
| 5-7187 | 1/1993 | Japan . |
| 7-264475 | 10/1995 | Japan . |
| 8-237548 | 9/1996 | Japan . |

*Primary Examiner*—Ajit Patel
*Assistant Examiner*—Ricardo M. Pizarro
*Attorney, Agent, or Firm*—Frommer Lawrence & Haug, LLP.; William S. Frommer

[57] ABSTRACT

A matrix switcher which is applied to a switcher system of a broadcasting station, connects a plurality of input lines and a plurality of output lines at any points, and outputs source video signals to be supplied from desired output lines, more particularly a matrix switcher capable of easily confirming inputs corresponding to the outputs. An operation panel 40 of the switcher system in which a plurality of inputs and a plurality of outputs are freely connected by switching is provided with cross point buttons 40A for selecting a plurality of inputs, source name display units 40N for displaying the source names being input, delegation buttons 45A selecting a plurality of outputs, and output source name display units 45N displaying the source names to be selected and output. Where the predetermined output is selected in the delegation button 45A, the source name displayed on the output source name display unit 45N is changed to a source name newly selected by the cross point button 40A. By this, all of the source names selected at present at outputs can be directly confirmed at a glance.

24 Claims, 15 Drawing Sheets

FIG. 10

| INPUT LINE NUMBER (Prm) | CROSS POINT BUTTON NUMBER |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| ⋮ | ⋮ |
| 29 | 29 |

FIG. 11

| INPUT LINE NUMBER (Prm) | SOURCE NAME |
|---|---|
| 1 | CAM1 |
| 2 | CAM2 |
| 3 | CAM3 |
| 4 | VTR1 |
| 5 | VTR2 |
| 6 | VTR3 |
| 7 | VTR4 |
| 8 | DR1 |
| 9 | DR2 |
| 10 | DME1 |
| 11 | DME2 |
| 12 | DME3 |
| 13 | — |
| 14 | — |
| 15 | — |
| 16 | — |
| ⋮ | ⋮ |
| 29 | — |

FIG. 12

| INPUT LINE | | Prm | | | | | | | | | | | |
|---|---|---|---|---|---|---|---|---|---|---|---|---|---|
| | | 1 | 2 | 3 | 4 | 5 | 6 | 7 | 8 | 9 | ... | 28 | 29 |
| AUX | 1 | 1 | 0 | 0 | 0 | 0 | 0 | 0 | 0 | 0 | ... | 0 | 0 |
| | 2 | 0 | 1 | 0 | 0 | 0 | 0 | 0 | 0 | 0 | ... | 0 | 0 |
| | 3 | 0 | 0 | 1 | 0 | 0 | 0 | 0 | 0 | 0 | ... | 0 | 0 |
| | 4 | 0 | 0 | 0 | 0 | 0 | 0 | 0 | 0 | 0 | ... | 0 | 0 |
| | 5 | 0 | 0 | 0 | 0 | 0 | 0 | 0 | 0 | 0 | ... | 0 | 0 |
| | 6 | 0 | 0 | 0 | 0 | 0 | 0 | 0 | 0 | 0 | ... | 0 | 0 |
| | 7 | 0 | 0 | 0 | 0 | 0 | 1 | 0 | 0 | 0 | ... | 0 | 0 |
| | 8 | 0 | 0 | 0 | 0 | 0 | 0 | 1 | 0 | 0 | ... | 0 | 0 |
| | 9 | 0 | 0 | 0 | 0 | 0 | 0 | 0 | 1 | 0 | ... | 0 | 0 |
| | 10 | 0 | 0 | 0 | 0 | 0 | 0 | 0 | 0 | 0 | ... | 0 | 0 |
| | 11 | 0 | 0 | 0 | 0 | 0 | 0 | 0 | 0 | 0 | ... | 0 | 0 |
| | 12 | 0 | 0 | 0 | 0 | 0 | 0 | 0 | 0 | 0 | ... | 0 | 0 |
| | 13 | 0 | 0 | 0 | 0 | 0 | 0 | 0 | 0 | 0 | ... | 0 | 0 |
| M/E1 | K | 0 | 0 | 0 | 0 | 0 | 0 | 0 | 0 | 0 | ... | 0 | 0 |
| | A | 0 | 0 | 0 | 0 | 0 | 0 | 0 | 0 | 0 | ... | 0 | 0 |
| | B | 0 | 0 | 0 | 0 | 0 | 0 | 0 | 0 | 0 | ... | 0 | 0 |
| M/E2 | K | 0 | 0 | 0 | 0 | 0 | 0 | 0 | 0 | 0 | ... | 0 | 0 |
| | A | 0 | 0 | 0 | 0 | 0 | 0 | 0 | 0 | 0 | ... | 0 | 0 |
| | B | 0 | 0 | 0 | 0 | 0 | 0 | 0 | 0 | 0 | ... | 0 | 0 |
| M/E3 | K | 0 | 0 | 0 | 0 | 0 | 0 | 0 | 0 | 0 | ... | 0 | 0 |
| | A | 0 | 0 | 0 | 0 | 0 | 0 | 0 | 0 | 0 | ... | 0 | 0 |
| | B | 0 | 0 | 0 | 0 | 0 | 0 | 0 | 0 | 0 | ... | 0 | 0 |

LIST OF REFERENCES

1 ... PROCESSOR

2 ... CONTROL PANEL

2c ... PANEL CONTROL BLOCK

10 ... FIRST SIGNAL SELECTION OPERATION BLOCK

20 ... SECOND SIGNAL SELECTION OPERATION BLOCK

30 ... THIRD SIGNAL SELECTION OPERATION BLOCK

40 ... AUX SIGNAL SELECTION OPERATION BLOCK

40A ... CROSS POINT BUTTON COLUMN

40N ... SOURCE NAME DISPLAY UNIT

45A ... DELEGATION BUTTON COLUMN

45N ... OUTPUT SOURCE NAME DISPLAY UNIT

101 ... CPU

104 ... MATRIX PORTION

110 ... FIRST SIGNAL SELECTION BLOCK

120 ... SECOND SIGNAL SELECTION BLOCK

130 ... THIRD SIGNAL SELECTION BLOCK

140 ... AUX SIGNAL SELECTION BLOCK

401A ... FIRST CROSS POINT BUTTON

402A ... SECOND CROSS POINT BUTTON

401N ... FIRST NAME DISPLAY UNIT

402A ... SECOND NAME DISPLAY UNIT

451A ... FIRST DELEGATION BUTTON

452A ... SECOND DELEGATION BUTTON

451N ... FIRST NAME DISPLAY UNIT

452A ... SECOND NAME DISPLAY UNIT

MATRIX SWITCHER

TECHNICAL FIELD

The present invention relates to a matrix switcher for switching cross points at which a plurality of input lines and a plurality of output lines are connected so as to output source video signals supplied to the input lines from the desired output lines. More particularly, it relates to a matrix switcher which displays source names given to the source video signals in correspondence to a plurality of operation buttons for switching cross points provided in a control panel so as to enable an operator to visually recognize the cross points.

BACKGROUND ART

As a switcher system for a broadcasting station, a matrix switcher having a plurality of input lines and a plurality of output lines has been used. This matrix switcher is an apparatus which outputs source video signals supplied to the input lines from the desired output lines by switching cross points at which these input lines and output lines are connected.

Such a matrix switcher is provided with a control panel having a plurality of operation buttons for switching the plurality of cross points. This control panel is also referred to as an operation desk. The operator can freely switch cross points by using the operation buttons on this control panel.

In recent broadcasting stations systems, however, the number of input devices such as video cameras and VTRs connected to one matrix switcher and the number of output devices such as disc recorders and servers have been increasing as a general trend. For example, when assuming that 10 input lines and 10 output lines are provided and taking an increase of the input and output devices into account, this means an existence of 100 cross points. Conventionally, in order to individually switch these 100 cross points, 100 operation buttons have been arranged on the control panel.

However, there is a limit to the surface area on the control panel, and it is difficult to arrange still more buttons than this. Further, in recent broadcasting stations systems, the number of input devices such as video cameras and VTRs connected to one matrix switcher and the number of output devices such as disc recorders and servers have been increasing even more. Accordingly, it can be considered that the number of the cross points will further increase. Arrangement of more than 100 buttons on the control panel has been difficult in terms of space.

Further, on the control panel of a conventional matrix switcher, only a plurality of operation buttons for switching the cross points have been provided. For this reason, in order to recognize from which source device a signal being output from a certain output line is being supplied, the operator has to examine the cross point with the input line set on the output line and further examine the source device connected to that input line. For this reason, it is difficult for the operator to quickly recognize from which source device the signal being output from a certain output line is being supplied. Particularly, in broadcasting stations systems, there are case where the switched video is being broadcast on the air in each home as is, for example, the case of a live broadcast, and a real time property is required at the time of transmission of the video. Therefore there has been a demand for the operation time of the operator to be shortened as much as possible and for errors in the operation to be reduced.

DISCLOSURE OF THE INVENTION

A matrix switcher according to the present invention is a matrix switcher for switching cross points formed by a plurality of input lines and a plurality of output lines and is provided with a plurality of cross point buttons for selecting desired input lines from the plurality of input lines, a control panel having a plurality of delegation buttons for selecting desired output lines from the plurality of output lines, and a panel controlling means for displaying source names given to the source signals supplied to the input lines in predetermined name display portions and displaying the source names given to the source signals output from the output lines via the cross points in the predetermined name display portions.

Accordingly, source names given in advance to signals to be output to the output lines are displayed on the name display units of the control panel in correspondence to the delegation buttons indicating the output lines, therefore the operator can visually directly grasp the device to which the source signal is supplied.

Further, the matrix switcher of the present invention has a cross point allocation table for storing allocation data to be allocated to the plurality of cross point buttons with respect to the plurality of input lines and a source name table for storing source names individually given to source signals to be supplied to a plurality of input lines.

Accordingly, a plurality of input lines can be freely allocated to a plurality of cross point buttons. Further, any source names can be given to the source input signals. Further, in the matrix switcher of the present invention, the cross point allocation table and the source name table are stored in a nonvolatile memory, therefore even after turning off the power supply of the switcher, the data of the tables can be re-used.

Further, the matrix switcher of the present invention has a cross point table for storing cross point information indicating connection/disconnection state of all cross points in the matrix portion inside a processor. Accordingly, the panel controlling means can always grasp the connection/disconnection state of the cross points of the matrix portion and can carry out high speed control with respect to the control panel.

Further, in the matrix switcher of the present invention, an input line to be connected to an output line corresponding to a delegation button is selected based on the information of the cross point table, and the source name given to the source signal to be supplied to the selected input line is displayed based on the source name table.

Further, in the matrix switcher of the present invention, one output line is selected from among the plurality of output lines in response to the operation of an operation button among the plurality of delegation buttons, then one input line is selected from among the plurality of input lines in response to the operation of an operation button among the plurality of cross point buttons so as to select one cross point from among the plurality of cross points of the matrix portion.

Accordingly, the cross points can be reliably selected by a small number of operation buttons on the control panel.

Further, the matrix switcher of the present invention carries out a first processing of selecting one output line from among a plurality of output lines in response to a button selected by the operator from among delegation buttons, a second processing of selecting an input line already connected to the output line selected in the first processing from among a plurality of such input lines based on the information of the cross point table and selecting a cross point set with respect to the output line selected in the first processing from among a plurality of such cross points in the processor, a third processing of selecting a cross point button allocated to the input line selected in the second processing from among a plurality of such cross point buttons based on a cross point button allocation table, and a fourth processing for turning on the cross point button selected in the third processing. Accordingly, when the operator operates an delegation button, the cross point button set in correspondence to the input line connected to the output line in correspondence to that delegation button can be automatically turned on.

Further, the matrix switcher of the present invention carries out a fifth processing of detecting whether or not a button other than the cross point button turned on in the fourth processing is selected by the operation of the operator, a sixth processing of selecting the input line corresponding to the first operation button selected in the fifth processing from among a plurality of such input lines based on the cross point button allocation table, a seventh processing of selecting one cross point as the cross point which should be connected from among a plurality of cross points in accordance with the output line selected in the first processing and the input line selected in the sixth processing, and an eighth processing of transmitting a control command for switching the cross point selected in the second processing from the connection state to the disconnection state and a control command for switching the cross point selected in the seventh processing from the disconnection state to the connection state to the processor. Accordingly, by just operating the delegation button and cross point button, the cross points can be automatically switched, and the handling of the button operation is improved.

Further, the matrix switcher of the present invention carries out a ninth processing of retrieving the source name given to the input line selected in the sixth processing based on the name data of a source name table, and a 10th processing of newly displaying the source name retrieved in the ninth processing on the name display portion corresponding to the output line selected in the first processing in place of the source name which has been already displayed. Accordingly, when switching the cross point, the name to be automatically displayed is changed in accordance with the switching.

BRIEF DESCRIPTION OF THE DRAWINGS

The above object and features of the present invention will be more apparent from the following description given with reference to the accompanying drawings, wherein:

FIG. 10 is a view of a cross point button allocation table;

FIG. 11 is a view of the source name table;

FIG. 12 is a view of a cross point table;

BEST MODE FOR CARRYING OUT THE INVENTION

Figure 1:
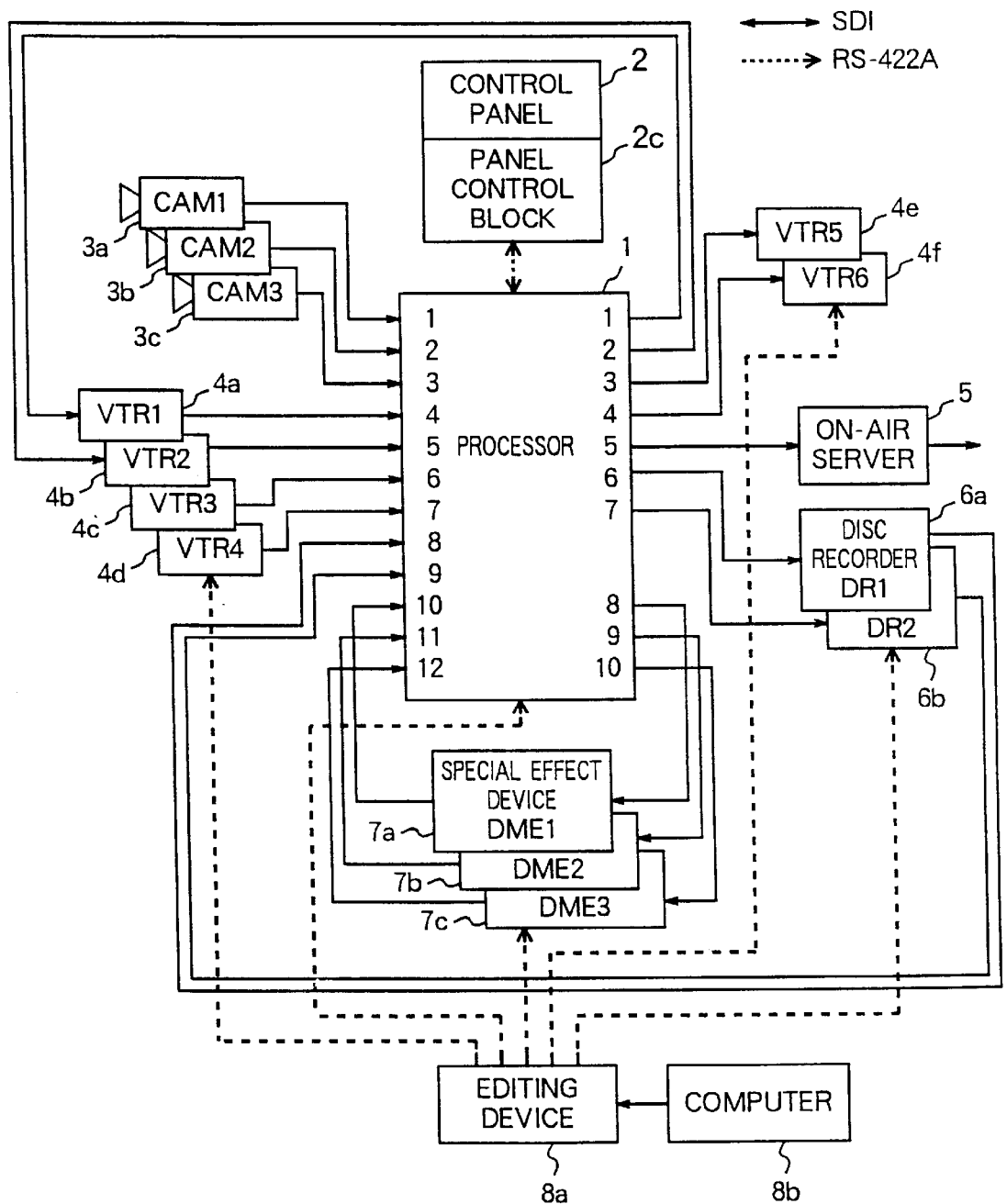
FIG. 1 is a view of the overall configuration of a switcher system in which a matrix switcher of the present invention is used.

A detailed explanation will be made next of the switcher system according to the present invention by referring to the attached drawings.

1. Explanation of Entire System

First, an explanation will be made of a switcher system for a broadcasting station in which the matrix switcher of the present invention is used by referring to FIG. 1.

This switcher system has a processor 1, a control panel 2, and a panel control block 2c. The processor 1 is provided with a signal processing circuit for carrying out the signal processing with respect to video signals supplied to the input unit and a switching circuit for switching a plurality of video signals supplied to the input unit and outputting the same to a plurality of output units. The control panel 2 has a plurality of operation buttons and display portions etc. The panel control block 2c is a block provided on a substrate on the back surface of the control panel 2. This panel control block 2c is connected to the processor 1 by a communication cable of the RS-422A format and transmits a control signal with respect to the processor 1 in accordance with the operation state of the control panel. Concretely, this panel control block 2c indicates the signal processing to be carried out in the signal processing circuit provided inside the processor 1 or controls the switching of the cross points in the switching circuit.

Twenty-nine input lines are provided on the input side of this processor 1, and 13 output lines are provided on the output side of this processor. For convenience of the ensuing explanation, these 29 input lines will be referred to as first primary input (1) line (Prm1), second primary input (2) line (Prm2), third primary input (3) line (Prm3), . . . , and 29th primary input (29) line (Prm29). Further, these 13 output lines will be referred to as first auxiliary output line (AUX1), second auxiliary output line (AUX2), third auxiliary output line (AUX3), . . . , and 13th auxiliary output line (AUX13).

For example, as shown in FIG. 1, a first video camera 3a is connected to the first input line Prm1 (denoted as "1") of the processor 1, a second video camera 3b is connected to the second input line Prm2 (denoted as "2"), a third video camera 3c is connected to the third input line Prm3, a first VTR 4a for recording and reproduction is connected to a fourth input line Prm4, a second VTR 4b for recording and reproduction is connected to a fifth input line Prm5, a third VTR 4c for reproduction is connected to a sixth input line Prm6, a fourth VTR 4d for reproduction is connected to a seventh input line Prm7, a first disc recorder 6a is connected to an eighth input line Prm8, a second disc recorder 6b is connected to a ninth input line Prm9, a first special effect device 7a is connected to a 10th input line Prm10, a second special effect device 7b is connected to an 11th input line Prm11, and a third special effect device 7c is connected to a 12th input line Prm12.

Note that, in the present embodiment, it is assumed that no device is connected to input lines from the 13th input line Prm13 to the 29th input line Prm29, so an illustration of these lines is omitted. Further, the connection of these input lines and devices is not limited to the example shown in FIG. 1; other connections are possible.

Further, as shown in FIG. 1, first VTR 4a is connected to the first output line AUX1, a second VTR 4b is connected to the second output line AUX2, a fifth VTR 4e is connected to the third output line AUX3, a sixth VTR 4f is connected to the fourth output line AUX4, an on-air server 5 which carries out buffering for on-air broadcasting of the video signal is connected to the fifth output line AUX5, the first disc recorder 6a is connected to the sixth output line AUX6, the second disc recorder 6b is connected to the seventh output line AUX7, the first special effect device 7a is connected to the eighth output line AUX8, the second special effect device 7b is connected to the ninth output line AUX9, and a third special effect device 7c is connected to the 10th output line AUX10. VTR's 4a–4f all have recording and reproduction capability.

Note that, it is assumed that no device is connected to output lines from the 11th output line AUX11 to the 13th output line AUX13, so these lines are not illustrated in FIG. 1. Further, the connection of these output lines and devices is not limited to the example shown in FIG. 1; other connections are possible.

Note that, special effect devices 7a, 7b, and 7c are devices for applying special effects such as image transformation in three-dimensional space with respect to the supplied video signals and are also referred to as "digital multi effectors".

Further, the illustrated switcher system is provided with an editing device 8a for editing source videos supplied to the processor 1 and a computer 8b for controlling the editing device 8a. This editing device 8a can control the processor 1, special effect devices 7a, 7b, and 7c, video cameras 3a, 3b, and 3c, VTR 4a, 4b, 4c, and 4d, and disc recorders 5a and 5b via the communication cable according to the RS-422A communication format. This editing device 8a receives the editing list representing the desired editing operation prepared by operation of the computer 8b by the operator. Then, the editing device 8a transmits the commands for instructing the video signal output to the video cameras 3a, 3b, and 3c in accordance with this editing list and transmits control commands such as reproduction, stop, and recording to the VTRs 4a, 4b, 4c, and 4d, the disc recorders 5a and 5b, etc. Further, this editing device 8a controls the type and timing of the special effects to be processed in the special effect devices 7a, 7b, and 7c and controls the switching timing of the switching circuit in the processor 1 based on this editing list.

2. Explanation of Processor

Next, a detailed explanation will be made of the processor 1 by referring to FIG. 2.

This embodiment of processor 1 is provided with a CPU unit 101 for controlling the entire processor 1, an input processing unit 103 for transforming video signals of an SDI (serial digital interface) format to parallel video signals for compatibility with the signal processing inside the switcher, a matrix portion 104 for switching the connection between a plurality of input signal lines and a plurality of output signal lines, chroma key circuits 105, 106, and 107 for generating chroma key signals from YUV signals supplied for the generation of key signals, a first M/E (mix/effect) circuit 150 for applying effects to a video signal or mixing two video signals based on the video signals and key signals supplied from the matrix portion 104 and the chroma key circuits 105, 106, and 107, a second M/E circuit 160, a third M/E circuit 170, and an output processing unit 108 for transforming the video signals output to a plurality of output lines to video signals of the SDI format.

Processor 1 is provided with 29 input lines from the first input line Prm1 to the 29th input line Prm29 as the input lines for inputting signals to the input processing unit 103 and the matrix portion 104.

On the other hand, in this processor 1, as the output lines for outputting the signals from the matrix portion 104 and the output processing unit 108, 13 output lines comprising the first output line AUX1 to the 13 output line AUX13 are provided. Further, as the output lines from the first M/E circuit 150, second M/E circuit 160, and third M/E circuit 170, first, second, and third program lines are provided.

Note that the video signal to be output to the first program line is the video signal subjected to the effect processing and mix processing by the first M/E circuit 150, the video signal to be output to the second program line is the video signal subjected to the effect processing and mix processing by the second M/E circuit 160, and the video signal to be output to the third program line is the video signal subjected to the effect processing and mix processing by the third M/E circuit 170.

Figure 2:
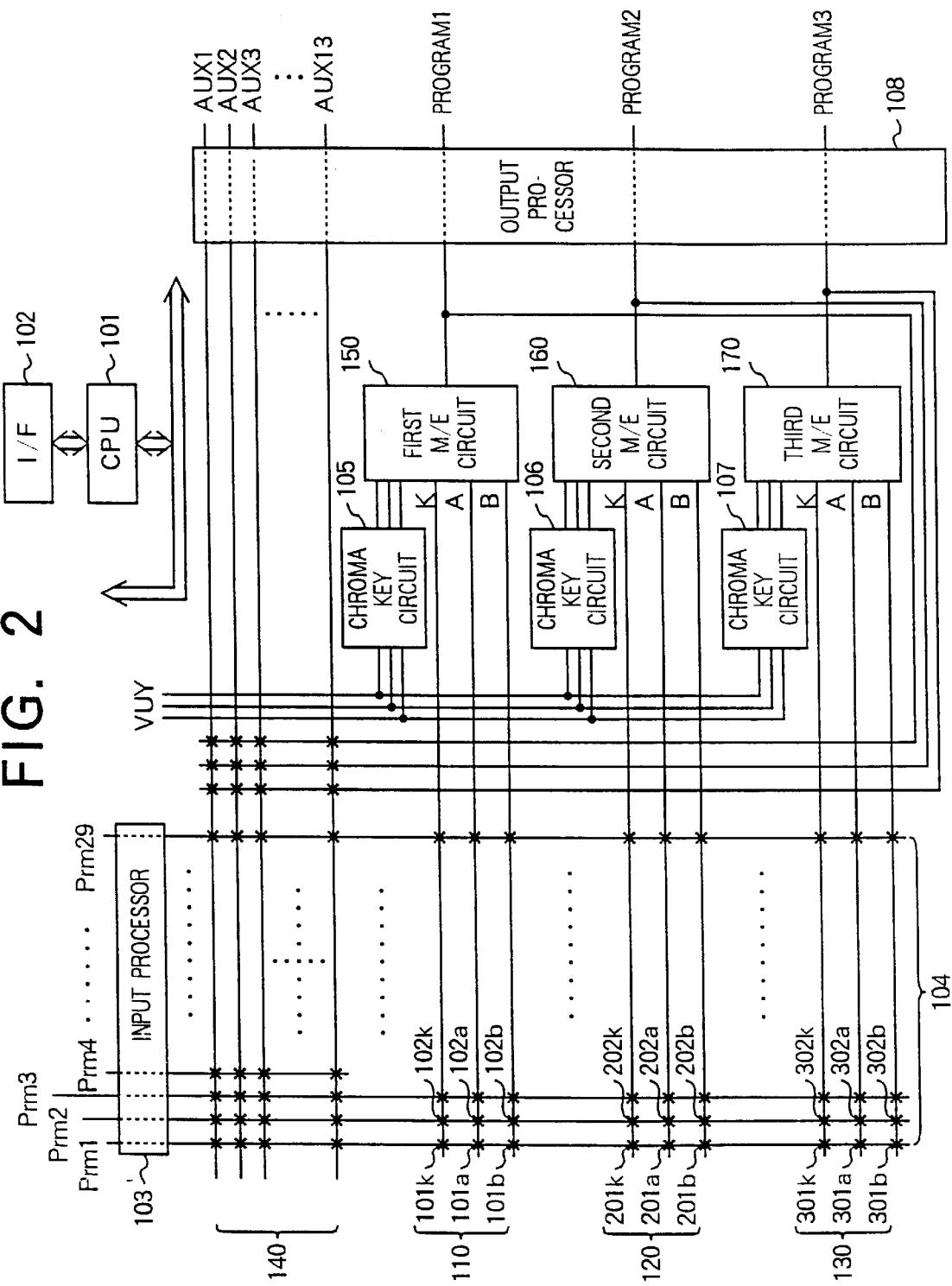
FIG. 2 is a block diagram of the configuration of the processor of the matrix switcher.

In the matrix portion 104, 29 input lines arranged in the vertical direction in FIG. 2 and 16 output lines arranged in a horizontal direction cross in the form of a matrix. By switching the cross points between the input lines and output lines indicated by "x" in FIG. 2, the connection between input lines and output lines can be freely selected.

Note that, these 29 input lines comprise the previously explained first input line Prm1 to the 29th input line Prm29. Further, these 16 output lines comprise the previously explained first output line AUX1 to the 13th output line AUX13 and the three output lines comprising the first program line to the third program line.

Further, this embodiment of matrix portion 104 is constituted by a first signal selection block 110 having three output lines connected to the first M/E circuit 150, a second signal selection block 120 having three output lines connected to the second M/E circuit 160, a third signal selection block 130 having three output lines connected to the third M/E circuit 170, and an AUX signal selection block 140 having 13 output lines comprising the previously explained first output line AUX1 to the 13th output line AUX13.

As shown in FIG. 2, the three output lines of the first signal selection block 110, three output lines of the second signal selection block 120, three output lines of the third signal selection block 130, and 13 output lines of the AUX signal selection block 140 cross with all input lines of the first input line Prm1 to the 29th input line Prm29. The cross points can be freely switched.

The chroma key circuits 105, 106, and 107 are circuits which receive a luminance signal Y and color difference signals U and V supplied from an external unit and generate various types of chroma key signals from these signals.

The first M/E circuit 150, the second M/E circuit 160, and the third M/E circuit 170 are circuits which apply effects such as three-dimensional transformation with respect to the video signal, apply "wipes" and other transitions between two video signals, and mix two video signals.

The CPU unit 101 receives the control commands transmitted from the panel control block 2c of the control panel 2 and controls the circuits of processor 1 in accordance with the control commands. For example, CPU unit 101 controls the switching of cross points at the matrix portion 104 based on the received control commands. Further, the CPU unit 101 controls the type of chroma keys generated in the chroma key circuits 105, 106, and 107, the type of effect to be applied to the video signals in the first to third M/E circuits 150, 160, and 170, or the ratio of mixing.

3. Explanation of Control Panel

Figure 3:
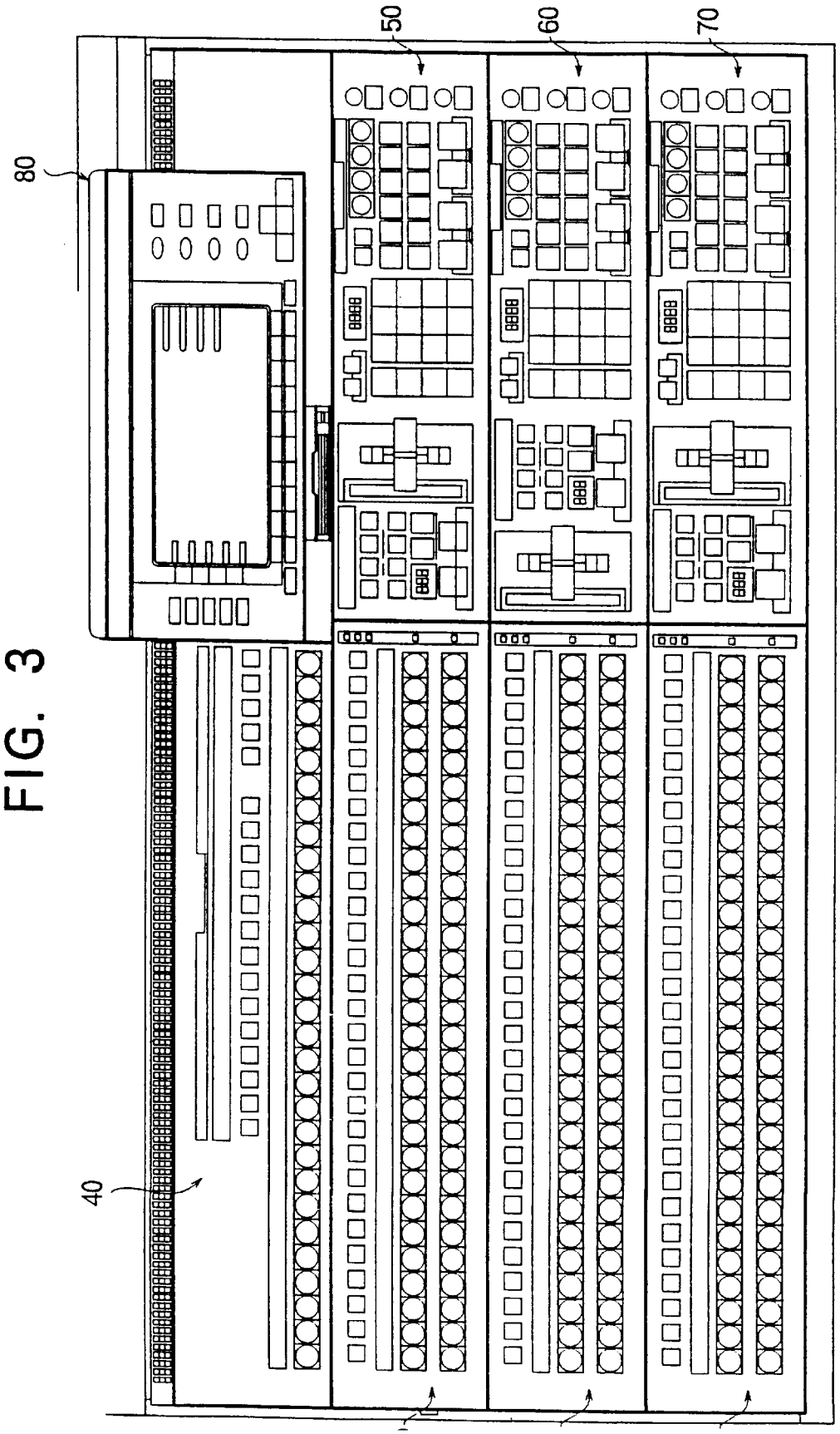
FIG. 3 is a view of an outer appearance of a control panel of the matrix switcher.

Next, an explanation will be made of the control panel 2 will be presented by referring to FIG. 3.

This embodiment of control panel 2 has a first signal selection operation block 10, a second signal selection operation block 20, a third signal selection operation block 30, an AUX signal selection operation block 40, a first M/E operation block 50, a second M/E operation block 60, a third M/E operation block 70, and a display block 80.

This first signal selection operation block 10 is a block in which a plurality of operation switches for operating the switching of cross points in the first signal selection block 110 of the processor 1 are arranged, the second signal selection operation block 20 is a block in which a plurality of operation switches for operating the switching of cross points in the second signal selection block 120 of the processor 1 are arranged, a third signal selection operation block 30 is a block in which a plurality of operation switches for operating the switching of cross points in the third signal selection block 130 of the processor 1 are arranged, and the AUX signal selection operation block 40 is a block in which a plurality of operation switches for operating the switching of cross points in the AUX signal selection block 140 of the processor 1 are arranged.

Further, the first M/E operation block 50 is a block in which a plurality of operation switches and operation levers for carrying out the operation concerning the effect processing and mixing processing to be carried out in the first M/E circuit 150 of the processor 1 are arranged, the second M/E operation block 60 is a block in which a plurality of operation switches and operation levers for carrying out the operation concerning the effect processing and mixing processing to be carried out in the second M/E circuit 160 of the processor 1 are arranged, and a third M/E operation block 60 is a block in which a plurality of operation switches and operation levers for carrying out the operation concerning the effect processing and mixing processing to be carried out in the third M/E circuit 170 of the processor 1 are arranged.

The display block 80 is a block for displaying a menu for carrying out the set up of the processor 1 and menus for selecting the effect to be carried out in the first M/E circuit 150, the second M/E circuit 160, and the third M/E circuit 170 from among a plurality of effects.

Next, an explanation will be made of the first signal selection operation block 10 by referring to FIG. 4.

This illustrative first signal selection block 10 has a foreground signal button column 10A for selecting the foreground video signal to be supplied to the first M/E circuit 150, a background signal button column 10B for selecting the background video signal to be supplied to the first M/E circuit 150, a key signal button column 10K for selecting the key signal to be supplied to the first M/E circuit 150, and a source name display unit 10N for displaying the name given to the source signal to be supplied to the input line of the foreground video signal button column 10A and the background video signal button column 10B.

Figure 4:
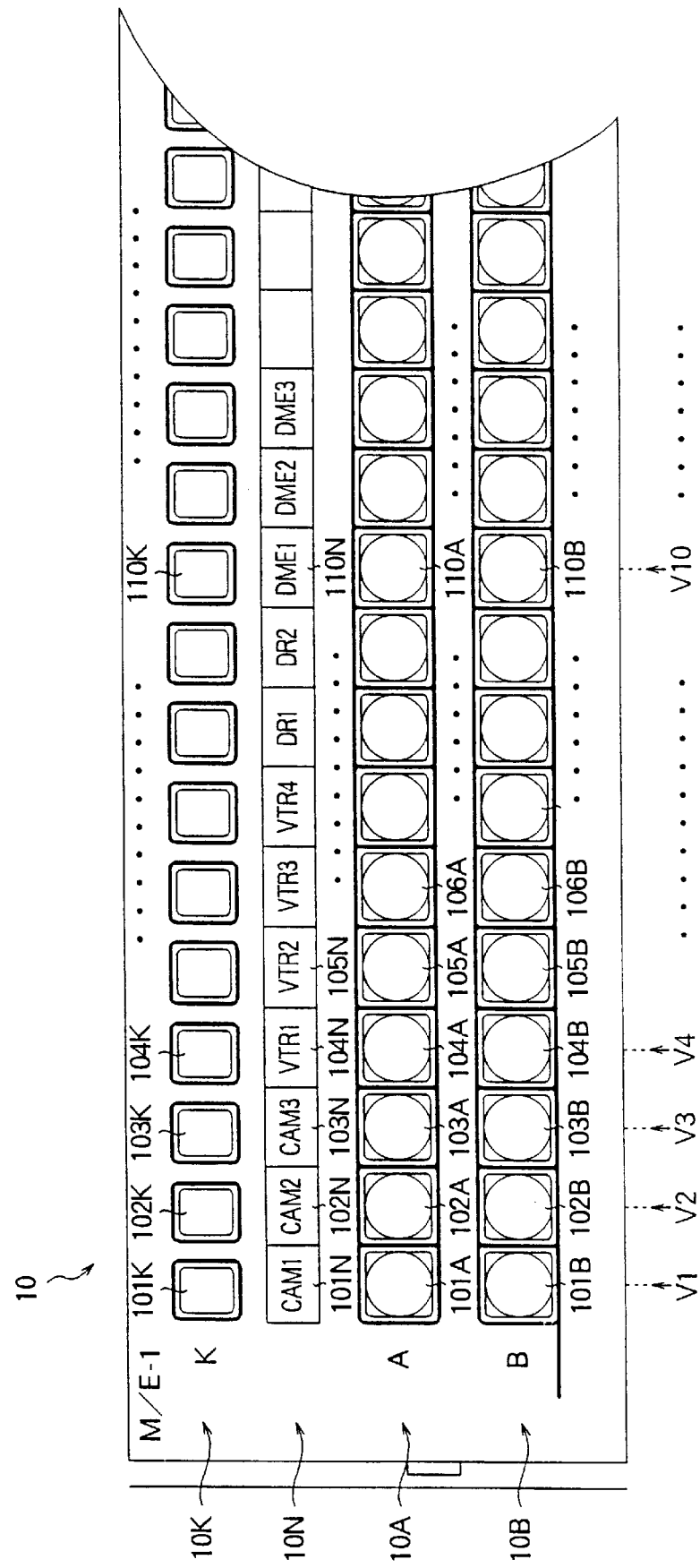
FIG. 4 is a view of a first signal selection operation block of the control panel.

In this foreground video signal button column 10A, as shown in FIG. 4, 29 cross point buttons in total comprising the first cross point button 101A at the first from the left, a second cross point button 102A at the second from the left, a third cross point button 103A at the third from the left, . . . , and a 29th cross point button 129A at the 29th from the left are arranged. Similarly, in the background video signal button column 10B, 29 cross point buttons in total comprising the first cross point button 101B at the first from the left, a second cross point button 102B at the second from the left, a third cross point button 103B at the third from the left, . . . , and a 29th cross point button 129B at the 29th from the left are arranged. Further, in the key signal button column 10K, 29 cross point buttons in total comprising the first cross point button 101K at the first from the left, a second cross point button 102K at the second from the left, a third cross point button 103K at the third from the left, . . . , a 29th cross point button 129K at the 29th from the left are arranged.

Note that for the first to 29th cross point buttons provided in these cross point button columns 10A, 10B, and 10C, identification numbers from "1" to "29" are respectively given from the left side.

The source name display unit 10N is provided with 29 name display units in total comprising a first name display unit 101N at the first from the left, a second name display unit 102N at the second from the left, a third name display unit 103N at the third from the left, . . . , and a 29th name display unit 129N at the 29th from the left. Concretely, on this source name display unit 10N, names given with respect to the input signals to be supplied to the input lines related to the cross point buttons of the cross point button columns 10A, 10B, and 10K are displayed. For example, in the example shown in FIG. 4, the name given to the input signal to be supplied to the input line Prm1 related to the first cross point buttons 101A, 101B, and 101K at the first from the left of the cross point button columns 10A, 10B, and 10K is "CAM1", and therefore, letters such as "CAM1" are displayed on this first name display unit 101N. Further, the name given to the source signal to be supplied to the input line Prm2 related to the second cross point buttons 102A, 102B, and 102K of the cross point button columns 10A, 10B, and 10K is "CAM2", therefore letters such as "CAM2" are displayed on this second name display unit 102N. Note that, the name to be given to the source signal is the name set up in advance. The method for giving names to the source signals will be discussed later.

Next, an explanation of the second signal selection operation block 20 will be given by referring to FIG. 5. Basically, it is exactly the same as the already explained first signal selection block 10.

This illustrative second signal selection block 20 has the same cross point columns as those of the first signal selection block. In particular, this second signal selection block 20 has a foreground signal button column 20A for selecting the foreground video signal to be supplied to the second M/E circuit 160, a background signal button column 20B for selecting the background video signal to be supplied to the second M/E circuit 160, a key signal button column 20K for selecting the key signal to be supplied to the second M/E circuit 160, and a source name display unit 20N for displaying the name given to the source signal to be supplied to the input line of the foreground video signal button column 20A and the background video signal button column 20B.

In this foreground video signal button column 20A, in order from the left, 29 cross point buttons in total comprising the first cross point button 201A, a second cross point button 202A, a third cross point button 203A, . . . , and a 29th cross point button 229A are arranged. Similarly, in the background video signal button column 20B, 29 cross point buttons in total comprising the first cross point button 201B, a second cross point button 202B, a third cross point button 203B, . . . , and a 29th cross point button 229B are arranged. Further, in the key signal button column 20K, in order from the left, 29 cross point buttons in total comprising the first cross point button 201K, a second cross point button 202K, a third cross point button 203K, . . . , a 29th cross point button 229K are arranged.

Note that, similar to the first signal selection block 10, identification numbers from "1" to "29" are respectively given from the left side to the 29 first to 29th cross point buttons provided in these cross point button columns 20A, 20B and 20C.

The source name display unit 20N is provided with, in order from the left, 29 name display units in total comprising a first name display unit 201N, a second name display unit 202N, a third name display unit 203N, . . . , and a 29th name display unit 229N. More specifically, on this source name display unit 20N, names given with respect to the input signals to be supplied to the input lines related to the cross point buttons arranged in the cross point button columns 20A, 20B, and 20K are displayed. For example, in the example of FIG. 6, the name given to the source signal supplied to the input line Prm1 related to the first cross point buttons 201A, 201B, and 201K in the cross point button columns 20A, 20B, and 20K is "CAM1", therefore, the letters such as "CAM1" are displayed on this first name display unit 201N. Further, the name given to the source signal related to the second cross point buttons 202A, 202B, and 202K in the cross point button columns 20A, 20B, and 20K is "CAM2", therefore the letters such as "CAM2" are displayed on this second name display unit 202N.

Figure 6:
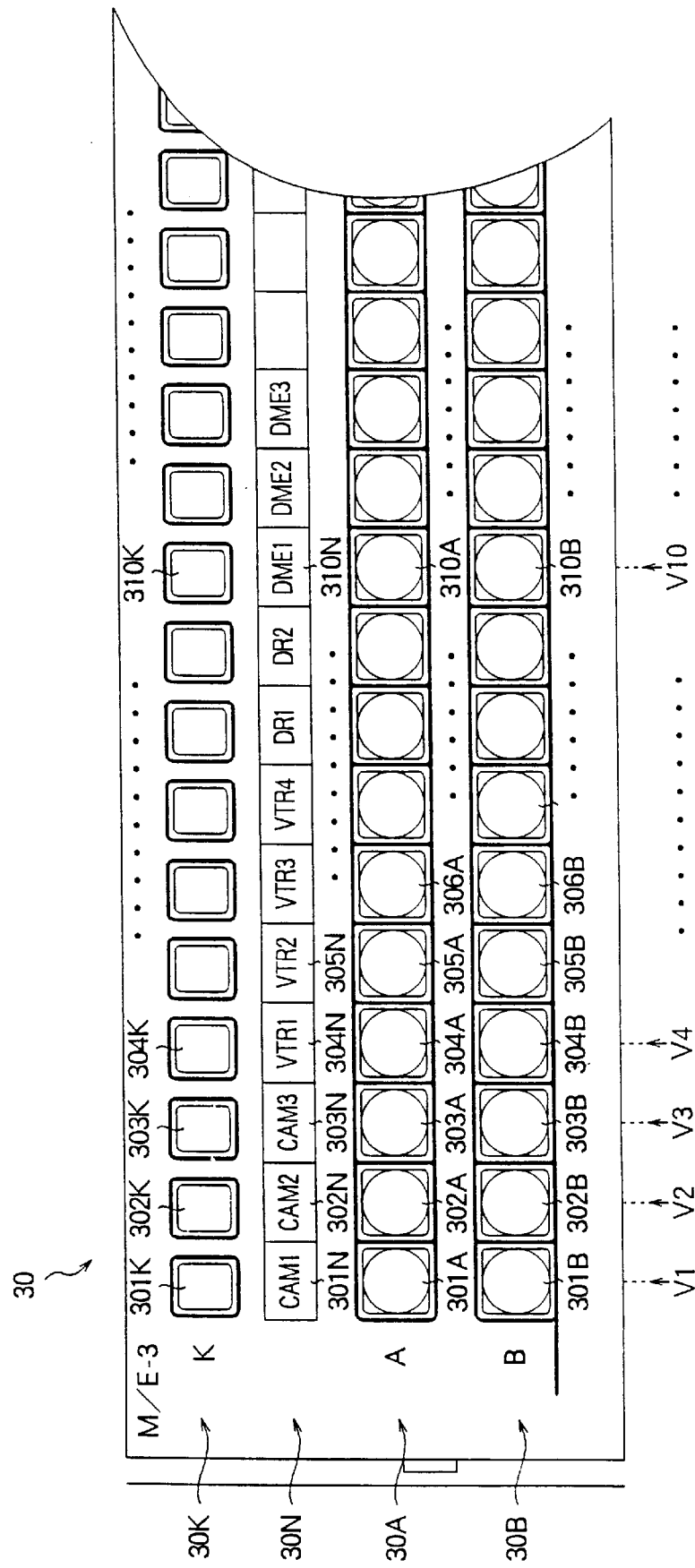
FIG. 6 is a view of a third signal selection operation block of the control panel.

Next, an explanation of the third signal selection operation block 30 will be presented by referring to FIG. 6. Basically, it is exactly the same as the already explained first signal selection operation block 10 and second signal selection operation block 20.

This third signal selection block 30 has the same cross point columns as those of the first and second signal selection blocks. Concretely, this third signal selection block 30 has a foreground signal button column 30A for selecting the foreground video signal to be supplied to the third M/E circuit 170, a background signal button column 30B for selecting the background video signal to be supplied to the third M/E circuit 170, a key signal button column 30K for selecting the key signal to be supplied to the third M/E circuit 170, and a source name display unit 30N for displaying the name given to the source signal to be supplied to the input line of the foreground video signal button column 30A and the background video signal button column 30B.

In this foreground video signal button column 30A, in order from the left, 29 cross point buttons in total comprising the first cross point button 301A, a second cross point button 302A, a third cross point button 303A, . . . , and a 29th cross point button 329A are arranged. Similarly, in the background video signal button column 30B, 29 cross point buttons in total comprising the first cross point button 301B, a second cross point button 302B, a third cross point button 303B, . . . , and a 29th cross point button 329B are arranged.

Further, in the key signal button column 30K, in order from the left, 29 cross point buttons in total comprising the first cross point button 301K, a second cross point button 302K, a third cross point button 303K, . . . , a 29th cross point button 329K are arranged.

Note that, similar to the already explained first signal selection operation block 10 and the second signal selection operation block 20, identification numbers from "1" to "29" are respectively given from the left side to 29 first to 29th cross point buttons provided in these cross point button columns 30A, 30B, and 30C.

The source name display unit 30N is provided with, in order from the left, 29 name display units in total comprising a first name display unit 301N, a second name display unit 302N, a third name display unit 303N, . . . , and a 29th name display unit 329N. In particular, on this source name display unit 30N, names given with respect to the input signals to be supplied to the input lines related to the cross point buttons arranged in the cross point button columns 30A, 30B, and 30K are displayed. For example, in the example of FIG. 7, the name given to the source signal supplied to the input line Prm1 related to the first cross point buttons 301A, 301B, and 301K in the cross point button columns 30A, 30B, and 30K is "CAM1", therefore, the letters such as "CAM1" are displayed on this first name display unit 301N. Further, the name given to the source signal supplied to the input line Prm2 related to the second cross point buttons 302A, 302B, and 302K in the cross point button columns 30A, 30B, and 30K is "CAM2", therefore the letters such as "CAM2" are displayed on this second name display unit 302N.

Here, the correspondence between the cross points of the matrix portion 104 of the processor 1 explained in FIG. 2 and the cross point buttons of the operation blocks 10, 20, and 30 explained in FIG. 4, FIG. 5, and FIG. 6 will be explained.

The first cross point button 101A of the first signal selection operation block 10 (refer to FIG. 4) corresponds to the cross point 101a of the first signal selection block 110 (refer to FIG. 2) of the matrix portion 104, the first cross point button 101B of the first signal selection operation block 10 corresponds to the cross point 101b of the first signal selection block 110, and the first cross point button 101K of the first signal selection operation block 10 corresponds to the cross point 101k of the first signal selection block 110. Similarly, the second to 29th cross point buttons 102A to 129A individually correspond to the cross points 102a to 129a, the second to 29th cross point buttons 102B to 129B individually correspond to the cross points 102b to 129b, and the second to 29th cross point buttons 102K to 129K individually correspond to the cross points 102k to 129k.

The first cross point button 201A of the second signal selection operation block 20 (refer to FIG. 5) corresponds to the cross point 201a of the second signal selection block 120 (refer to FIG. 2) of the matrix portion 104, the first cross point button 201B of the second signal selection operation block 20 corresponds to the cross point 201b of the matrix portion 104, and the first cross point button 201K of the second signal selection operation block 20 corresponds to the cross point 201k of the matrix portion 104. Similarly, the second to 29th cross point buttons 202A to 229A individually correspond to the cross points 202a to 229a, the second to 29th cross point buttons 202B to 229B individually correspond to the cross points 202b to 229b, and the second to 29th cross point buttons 202K to 229K individually correspond to the cross points 202k to 229k.

The first cross point button 301A of the third signal selection operation block 30 (refer to FIG. 6) corresponds to the cross point 301a of the third signal selection block 130 (refer to FIG. 2) of the matrix portion 104, the first cross point button 301B of the third signal selection operation block 30 corresponds to the cross point 301b of the matrix portion 104, and the first cross point button 301K of the third signal selection operation block 30 corresponds to the cross point 301k of the matrix portion 104. Similarly, the second to 29th cross point buttons 302A to 329A individually correspond to the cross points 302a to 329a, the second to 29th cross point buttons 302B to 329B individually correspond to the cross points 302b to 329b, and the second to 29th cross point buttons 302K to 329K individually correspond to the cross points 302k to 329k.

That is, as seen from the above explanation, the same input line Prm1 is allocated to all of the first cross point buttons 101A, 101B, 101K, 201A, 201B, 201K, 301A, 301B, and 301K at first from the left defined by the identification number "1" of the cross point button columns. To clarify further, this means that the first button line V1 of the vertical direction constituted by an arrangement of the first order first cross point buttons 101A, 101B, 101K, 201A, 201B, 201K, 301A, 301B, and 301K is set in correspondence to the first input line Prm1.

Accordingly, the same name is displayed on the first name display units 101N, 201N, and 301N in the first signal selection operation block 10, the second signal selection operation block 20, and the third signal selection operation block 30. In the examples shown in FIG. 4, FIG. 5, and FIG. 6, they are all the same name referred to as "CAM1".

Note that, for convenience of the ensuing explanation, as mentioned above, on the control panel 2, the vertical line constituted by an arrangement of the n-th cross point buttons having an identification number "n" will be referred to as an n-th button line Vn.

Further, for the vertical button line V2 comprising the second cross point buttons on the control panel 2 to the 29th vertical button line V29 comprising the 29th cross point buttons, the second input line Prm2 to the 29th input line Prm29 are similarly allocated. Accordingly, the same is true for the second name display units 102N, 202N, and 203N to the 29th name display units 129N, 229N, and 329N.

Figure 5:
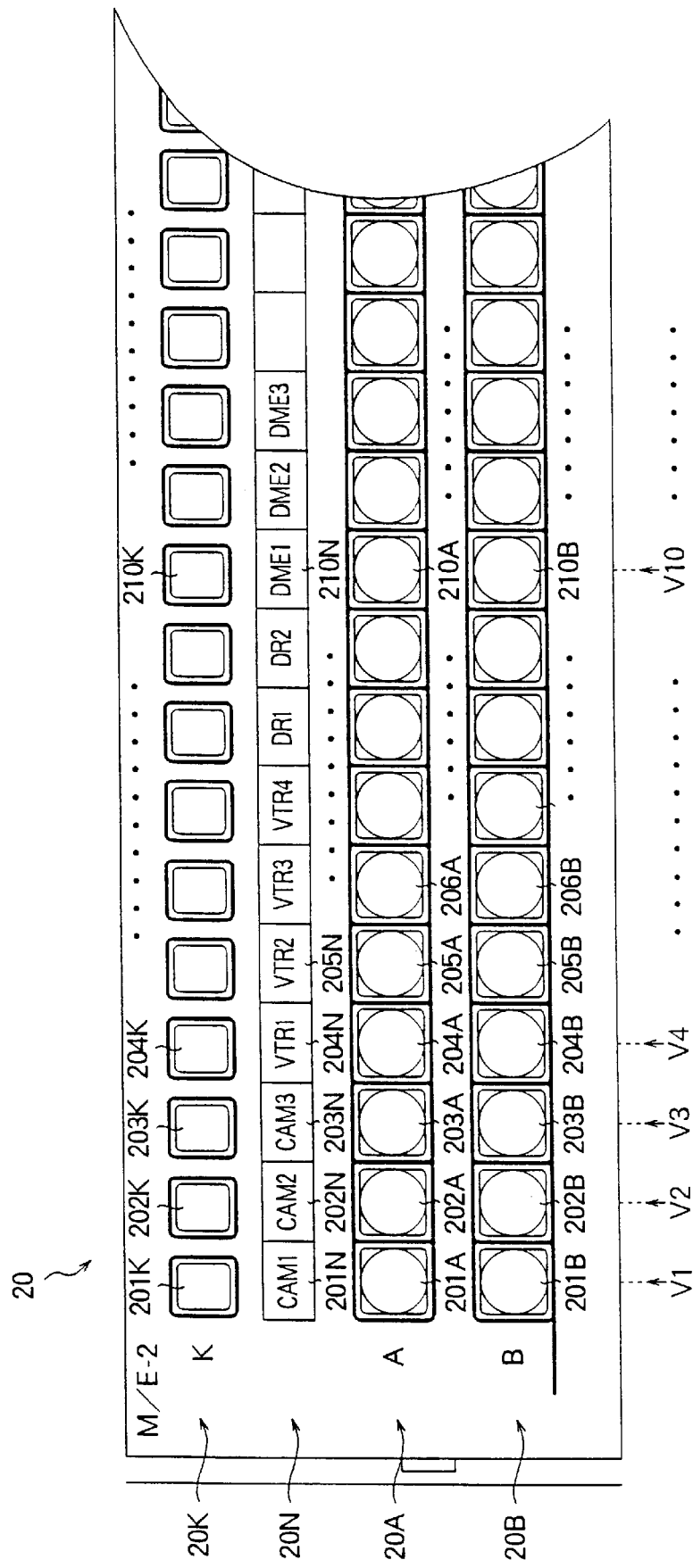
FIG. 5 is a view of a second signal selection operation block of the control panel.

Note that, in the examples shown in FIG. 4, FIG. 5, and FIG. 6, an example in which the first source input Prm1 was allocated to the first button line constituted by the first cross point buttons, the second source input Prm2 was allocated to the second button line constituted by the second cross point buttons, . . . , and the 29th source input Prm29 was allocated to the 29th button line constituted by the 29th cross point buttons was explained, but in the apparatus of the present invention, the allocation is not limited to this. The allocation of the cross point buttons with respect to the input lines can be freely set up according to the cross point button allocation table discussed later.

Next, a detailed explanation will be made of the AUX signal selection operation block 40 by referring to FIG. 7.

This AUX signal selection operation block 40 has a cross point button column 40A having cross point buttons for operating the switching of the cross points comprised by a matrix of 29 input lines of input lines Prm1 to Prm29 and 13 output lines of the output lines AUX1 to AUX13, a source name display unit 40N for displaying names given to the source signals supplied to the input lines allocated to the cross point buttons, a delegation button column 45A having delegation buttons for selecting one output line from among 13 output lines comprising the first output line AUX1 to the 13th output line AUX 13 with respect to the cross point button column 40A, and an output source name display unit 45N for displaying the name of the source signal being used in the output line corresponding to each delegation button at present.

Figure 7:
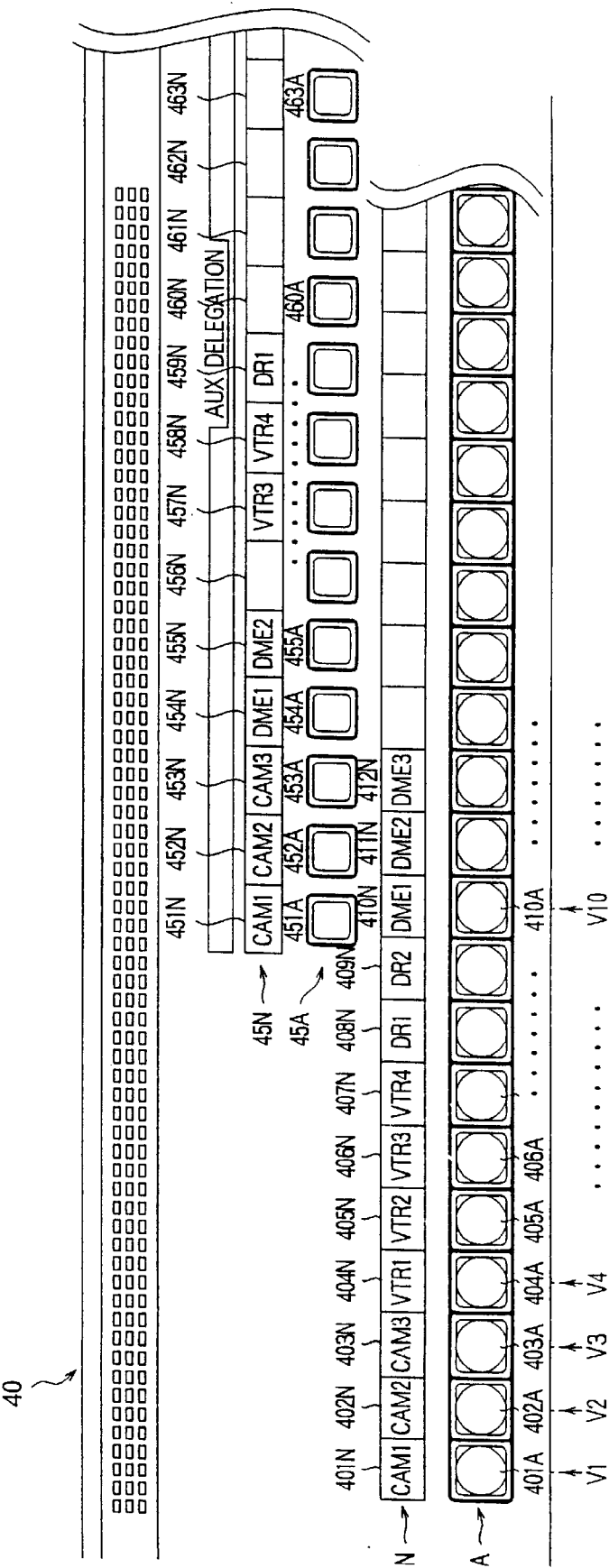
FIG. 7 is a view of an AUX signal selection operation block of the control panel.

In this cross point button column 40A, as shown in FIG. 7, 29 cross point buttons in total comprising a first cross point button 401A, a second cross point button 402A, a third cross point button 403A, . . . , and a 29th cross point button 429A are arranged in order from the left. Further, identification numbers from "1" to "29" are respectively given to the 29 first to 29th cross point buttons arranged in this cross point button column 40A from the left similar to the cross point buttons 101A to 129A, 201A to 229A, and 301A to 329A.

Further, the first cross point button 401A is provided on the first button line V1 indicating a vertical button line on the control panel 2, the second cross point button 402A is provided on the second button line V2, . . . , and the 29th cross point button 429A is provided on the 29th button line V29.

Namely, as explained by using FIG. 4, FIG. 5, and FIG. 6, similar to the correspondence of the first cross point buttons 101A, 101B, 101K, 201A, 201B, 201K, 301A, 301B, and 301K provided on the first button line V1 in the vertical direction on the control panel 2 to the first input line Prm1, the first cross point button 401A provided on this first button line V1 is set in correspondence to the first input line Prm1. Similarly, the second cross point button, the third cross point button, . . . , and the 29th cross point button are respectively set in correspondence to the second input line Prm2, third input line Prm3, . . . , and the 29th input line Prm29.

The source name display unit 40N is provided with, in order from the left, 29 name display units in total comprising a first name display unit 401N, a second name display unit 402N, a third name display unit 403N, . . . , and a 29th name display unit 429N. Concretely, on this source name display unit 40N, the names given to the source signals supplied to the input lines respectively set in correspondence to the cross point buttons 401A to 429A are displayed.

In the example shown in FIG. 7, the input line set in correspondence to the first cross point button 401A of the cross point button column 40A is the first input line Prm1, and the name given to the input source signal supplied to this input line is "CAM1", therefore letters such as "CAM1" are displayed on this first name display unit 401N.

That is, these 29 cross point buttons 401A to 429A respectively correspond to the 29 input lines Prm1 to Prm29 similar to the cross point buttons 101A to 129A, 201A to 229A, and 301A to 329A. Accordingly, on this source name display unit 45N, names the same as the names displayed on the source name display units 10N, 20N, and 30N of the signal selection operation blocks 10, 20, and 30 are displayed.

In the delegation button column 45A, 13 delegation buttons in total comprising the first delegation button 451A, second delegation button 452A, third delegation button 453A, . . . , and a 13th delegation button 463A are arranged in order from the left. Further, identification numbers of "1" to "29" are respectively given to the 13 first to 13th delegation buttons 451A to 463A provided in this delegation button column 45A from the left.

In the output source name display unit 45N, 13 name display units comprising a first name display unit 451N, second name display unit 452N, third name display unit 453N, . . . , and 13th name display unit 463N are provided in order from the left. Concretely, on these name display units 451N to 463N, names given to source signals output to the output lines AUX1 to AUX13 are respectively displayed.

Next, a further detailed explanation will be made of names displayed on this output source name display unit 45N by referring to FIG. 8. Note that, FIG. 8 is a view in which the AUX signal selection block 140 shown in FIG. 2 is enlarged.

Figure 8:
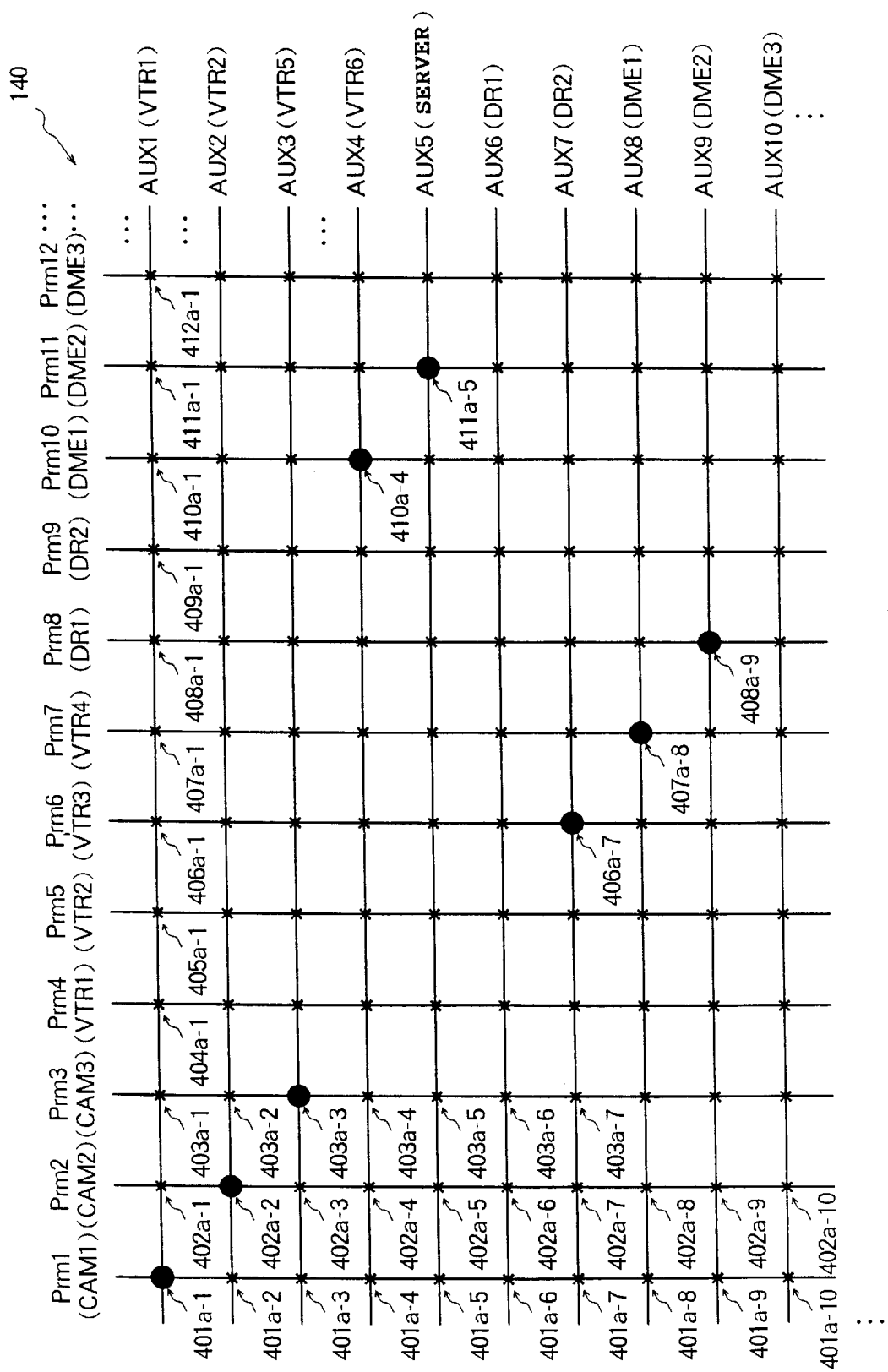
FIG. 8 is a view of the AUX signal selection block in a matrix portion.

FIG. 8 shows an example in which the first input line Prm1 and the first output line AUX1 are connected at the cross point 401a-1, the second input line Prm2 and the second output line AUX2 are connected at the cross point 402a-2, the third input line Prm3 and the third output line AUX3 are connected at the cross point 403a-3, the fourth input line Prm4 and the fourth output line AUX4 are connected at the cross point 404a-4, the fifth input line Prm5 and the fifth output line AUX5 are connected at the cross point 405a-5, the sixth input line Prm6 and the sixth output line AUX6 are connected at the cross point 406a-6, the seventh input line Prm7 and the seventh output line AUX7 are connected at the cross point 407a-7, the eighth input line Prm8 and the eighth output line AUX8 are connected at the cross point 408a-8, the ninth input line Prm9 and the ninth output line AUX9 are connected at the cross point 409a-9, the 10th input line Prm10 and the 10th output line AUX10 are connected at the cross point 410a-4, and the 11th input line Prm11 and the 11th output line AUX11 are connected at the cross point 411a-5.

That is, the signal output from the AUX first video camera CAM1 is output from the first output line AUX1 via the cross point 401a-1, the signal output from the second video camera CAM2 is output from the second output line AUX2 via the cross point 402a-2, the signal output from the third video camera CAM3 is output from the third output line AUX3 via the cross point 403a-3, the signal output from the third video tape recorder VTR3 is output from the seventh output line via the cross point 406a-7, the signal output from the fourth video tape recorder VTR4 is output from the eighth output line AUX8 via the cross point 407a-8, the signal output from the first disc recorder DR1 is output from the ninth output line AUX9 via the cross point 408a-9, the signal output from the first special effect device DME1 is output from the fourth output line AUX4 via the cross point 410a-4, and the signal output from the second special effect device DME2 is output from the fifth output line AUX5 via the cross point 411a-5.

Accordingly, letters such as "CAM1" are displayed on the first output source name display unit 451N corresponding to the first output line AUX1, letters such as "CAM2" are displayed on the second output source name display unit 452N corresponding to the second output line AUX2, letters such as "CAM3" are displayed on the third output source name display unit 453N corresponding to the third output line AUX3, letters such as "CAM4" are displayed on the fourth output source name display unit 454N corresponding to the fourth output line AUX4, letters such as "VTR3" are displayed on the seventh output source name display unit 457N corresponding to the seventh output line AUX7, letters such as "VTR4" are displayed on the eighth output source name display unit 458N corresponding to the eighth output line AUX8, and letters such as "DR1" are displayed on the ninth output source name display unit 459N corresponding to the ninth output line AUX9. Note that, there is no source signal being output to the sixth output line AUX6 in the sixth output source name display unit 456N, therefore the source name is not displayed.

Next, a further detailed explanation will be made of the relationship between the cross point buttons of the AUX signal selection operation block 40 and the cross points of the AUX signal selection operation block 140 by referring to FIG. 7 and FIG. 8.

First, the first cross point 401A is set in correspondence to the first input line Prm1, therefore by operating this cross point button 401A, the switching of 13 cross points 401a-1, 401a-2, 401a-3, . . . , and 401a-13 on the first input line Prm1 can be operated. Similarly, the second cross point 402A is set in correspondence to the second input line Prm2, therefore by operating this second point button 402A, the switching of 13 cross points 401a-1, 401a-2, 401a-3, . . . , and 401a-13 on the second input line Prm2 can be operated. That is, by operating the n-th cross point button 40'n'A of the "n"-th order from the left, the switching of 13 cross points on the "n"-th input line Prm'n' can be operated.

The 13 delegation buttons 451A to 463A are respectively related to 13 output lines AUX1 to AUX13. By operating these delegation buttons, one output line can be selected from among 13 output lines AUX1 to AUX13.

For example, the second output line AUX2 is selected when the second delegation button 452A is pushed, and the fourth output line AUX4 is selected when the fourth delegation button 454A is pushed.

It should be noted here that these delegation buttons 451A to 463A are only cross point buttons for selecting one output line from among the output lines AUX1 to AUX13. The connection of cross points is not switched by these buttons.

Note that FIG. 7 and FIG. 8 shows an example in which the first input line Prm1 is allocated to the first cross point button 401A, the second source input Prm2 line is allocated to the second cross point button 402A, . . . , and the 29th input line Prm29 is allocated to the 29th cross point button 429A, but in the apparatus of the present invention, the allocation is not limited to such an allocation.

That is, similar to the allocation of input lines with respect to the cross point buttons in the signal selection blocks 10, 20, and 30, the allocation of the cross point buttons 401A to 429A with respect to the input lines Prm1 to Prm29 can be freely set up according to the cross point button allocation table presented later.

4. Explanation of Panel Control Block

Figure 9:
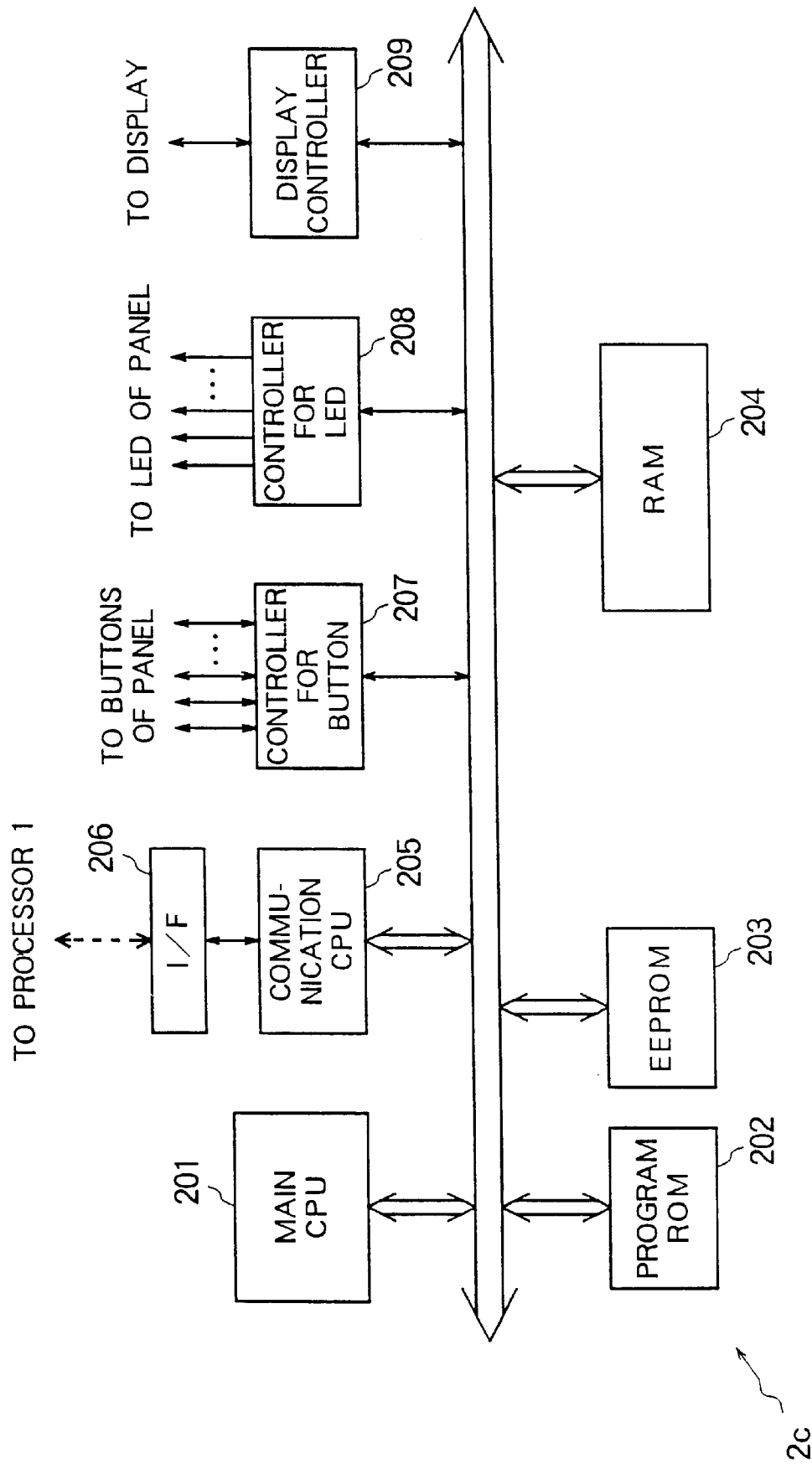
FIG. 9 is a block diagram of the configuration of a panel control block.

Next, an explanation will be made of a panel control block 2c for controlling the control panel 2 by referring to FIG. 9.

This panel control block 2c is provided on the substrate provided on the back side of the button arrangement surface (front surface) of the control panel 2 on which the cross point buttons are arranged. This panel control block 2c is a block for generating control signals in accordance with the ON/OFF state of the cross point buttons provided on the control panel 2 and outputting the control signals thereof to the processor 1 and controlling the emission of LED (light emission diode) of the cross point buttons and source name display units provided on the control panel 2.

Panel control block 2c has a main CPU 201 for controlling the circuits in the panel control block 2c via the control bus, a program ROM 202 for storing the program of the control operation of this panel control block 2c, a nonvolatile EEPROM (electric erasable program read only memory) 203 for storing the information set with respect to this control panel 2, a RAM 204 for storing the cross point state of the matrix portion 104 of the processor 1, a communication CPU 205 for carrying out the communication with the processor 1 via the interface circuit (I/F) 206, a controller 207 for button for receiving the signal representing the ON/OFF state of the cross point buttons provided on the control panel 2 from the cross point buttons and, at the same time, transmitting the control signal for displaying the LED for turning on the buttons provided in the cross point buttons, an LED use controller 208 for causing emission from the LEDs provided in the source name display units 10N, 20N, 30N, and 40N and output source name display unit 45N of the control panel 2, and a display controller 209 for driving the display provided in the display unit 50 of the control panel 2.

In this EEPROM 203, a cross point button allocation table for storing the correspondence between 29 primary input lines and 29 cross point buttons is stored.

This cross point button allocation table is concretely a table setting numbers indicating 29 primary input lines and identification numbers indicating 29 cross point buttons into correspondence as shown In FIG. 10.

The cross point allocation table shown In FIG. 10 is a table corresponding to FIG. 4, FIG. 5, FIG. 6, FIG. 7, and FIG. 8. The first cross point button is allocated to the first input line Prm1, the second cross point button is allocated to the second input line Prm2, . . . , and the 29th cross point button is allocated to the 29th input line Prm29.

Note that, this cross point button allocation table is a table which can be freely set up by the operator at the time of set up of the apparatus. The allocation Is not limited to that of the input lines and cross point buttons as shown in FIG. 10. Accordingly, the operator can freely allocate input lines to the cross point buttons, for example, allocate the fourth input line Prm4 to the first cross point button and allocate the seventh input line Prm7 to the third cross point button.

Further, in this EEPROM 203, a source name table having source names given to signals supplied to 29 primary input lines is stored.

This source name table is concretely a table where numbers indicating primary input lines and source names given to signals supplied to these 29 input lines are set in correspondence as shown in FIG. 11.

The source name table shown in FIG. 11 is a table corresponding to FIG. 1, FIG. 4, FIG. 5, FIG. 6, FIG. 7, and FIG. 8 and is a table indicating an example wherein the name of "CAM1" is given to the signal to be supplied to the first input line Prm1, the name of "CAM2" is given to the signal to be supplied to the second input line Prm2, the name of "CAM3" is given to the signal to be supplied to the third input line Prm3, the name of "VTR1" is given to the signal to be supplied to the fourth input line Prm4, the name of "VTR2" is given to the signal to be supplied to the fifth input line Prm5, the name of "VTR3" is given to the signal to be supplied to the sixth input line Prm6, the name of "VTR4" is given to the signal to be supplied to the seventh input line Prm7, the name of "DR1" is given to the signal to be supplied to the eighth input line Prm8, the name of "DR2" is given to the signal to be supplied to the ninth input line Prm9, the name of "DME1" is given to the signal to be supplied to the 10th input line Prm10, the name of "DME2" is given to the signal to be supplied to the 11th input line Prm11, and the name of "DME3" is given to the signal to be supplied to the 12th input line Prm12.

Note that the names stored in this source name table can be freely set up by the operator and are not limited to the names as shown in FIG. 11.

The RAM 204 has a cross point table for storing the ON/OFF state of cross points of the matrix portion 104 of the processor 1.

This cross point table is comprised by data obtained by storing states of cross points in the form of a map as shown in FIG. 12, and, in which, concretely, two bits of data indicating whether or not 13 output lines AUX1 to AUX13 from the AUX signal selection block 140, three output lines from the first signal selection block 110, three output lines from the second signal selection block 120, and three output lines from the third signal selection block 130 are connected to 29 input lines Prm1 to Prm29.

Note that, in FIG. 12, "1" indicates a state where the input line and the output line are connected, and "0" indicates that the input line and the output line are not connected.

5. Explanation of Operation of Matrix Switcher

Figure 13:
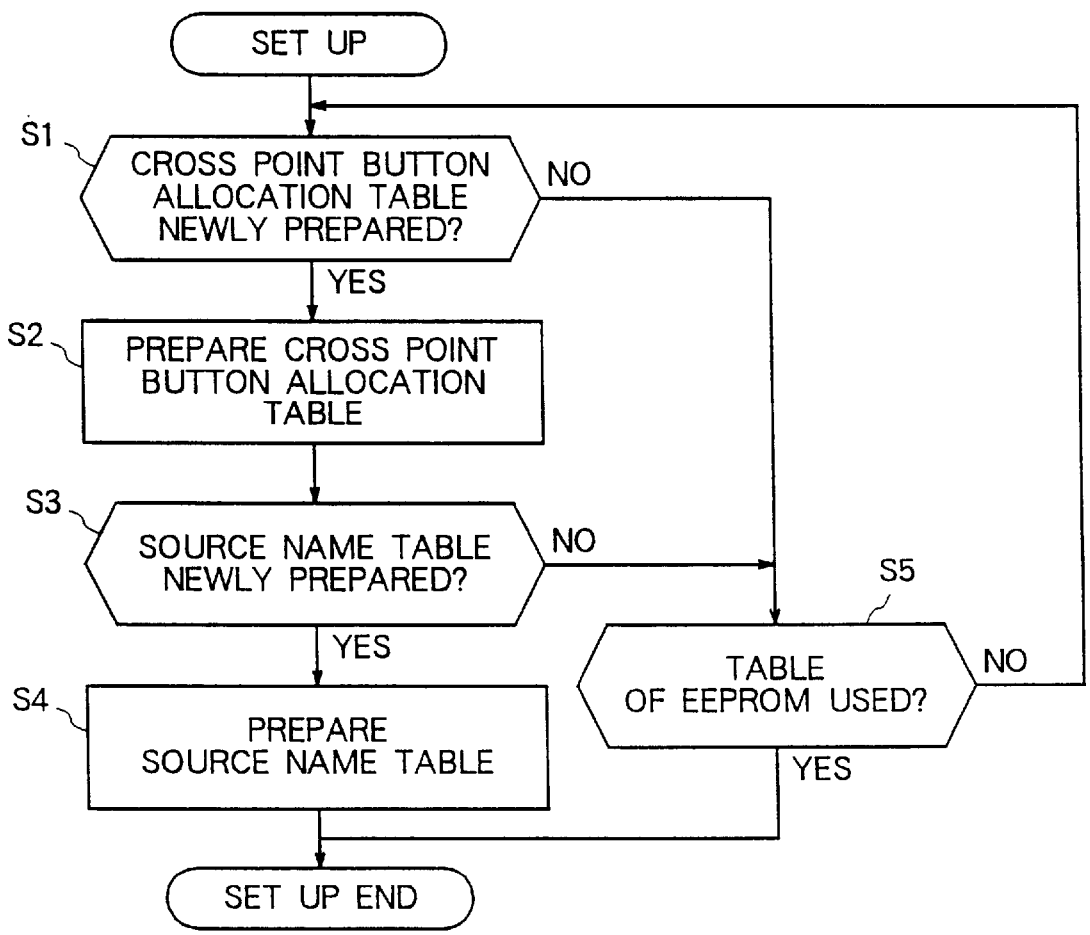
FIG. 13 is a flowchart of the operation at the time of set up of the matrix switcher of the present invention.
Figure 14:
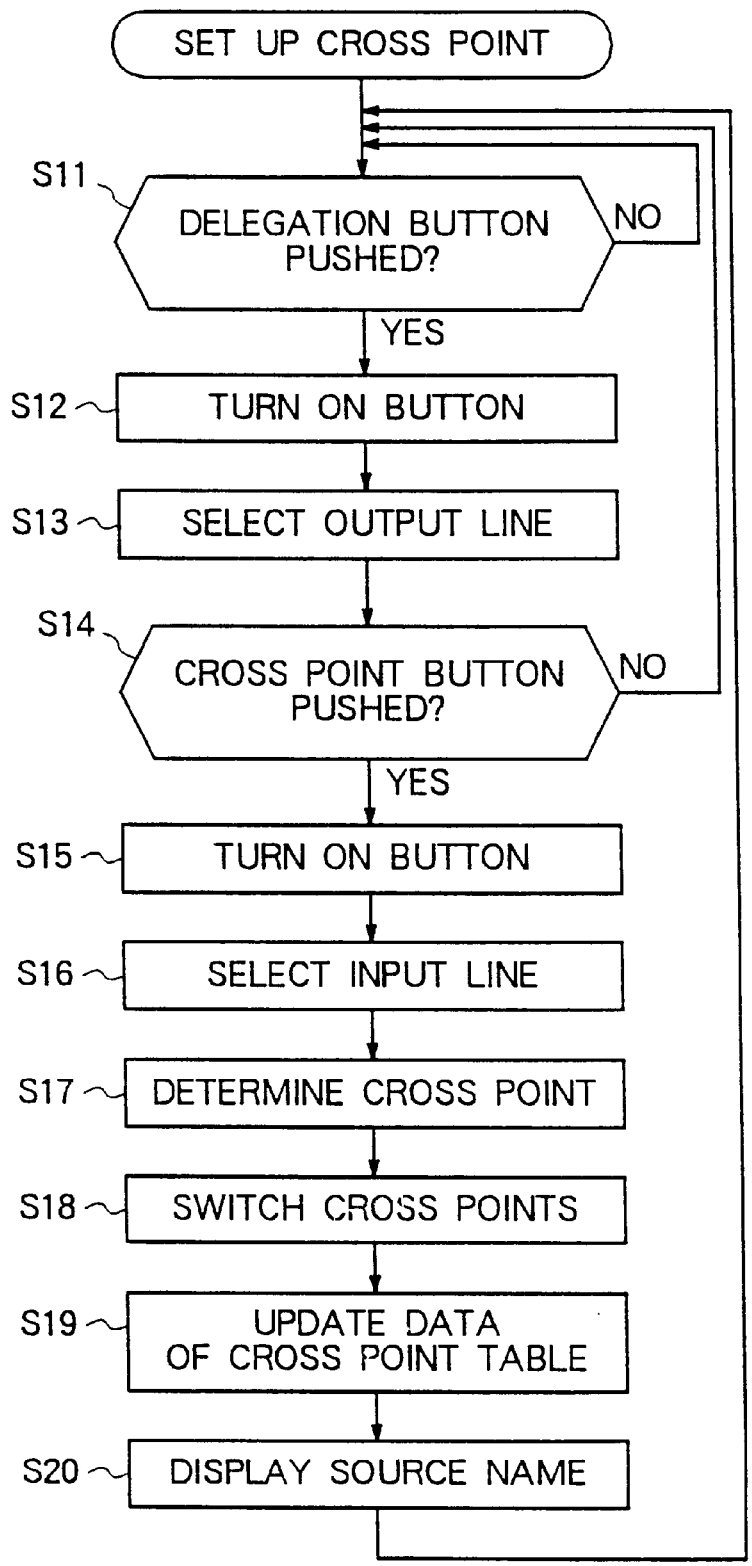
FIG. 14 is a flowchart of the operation for newly setting a cross point in the matrix switcher of the present invention.
Figure 15:
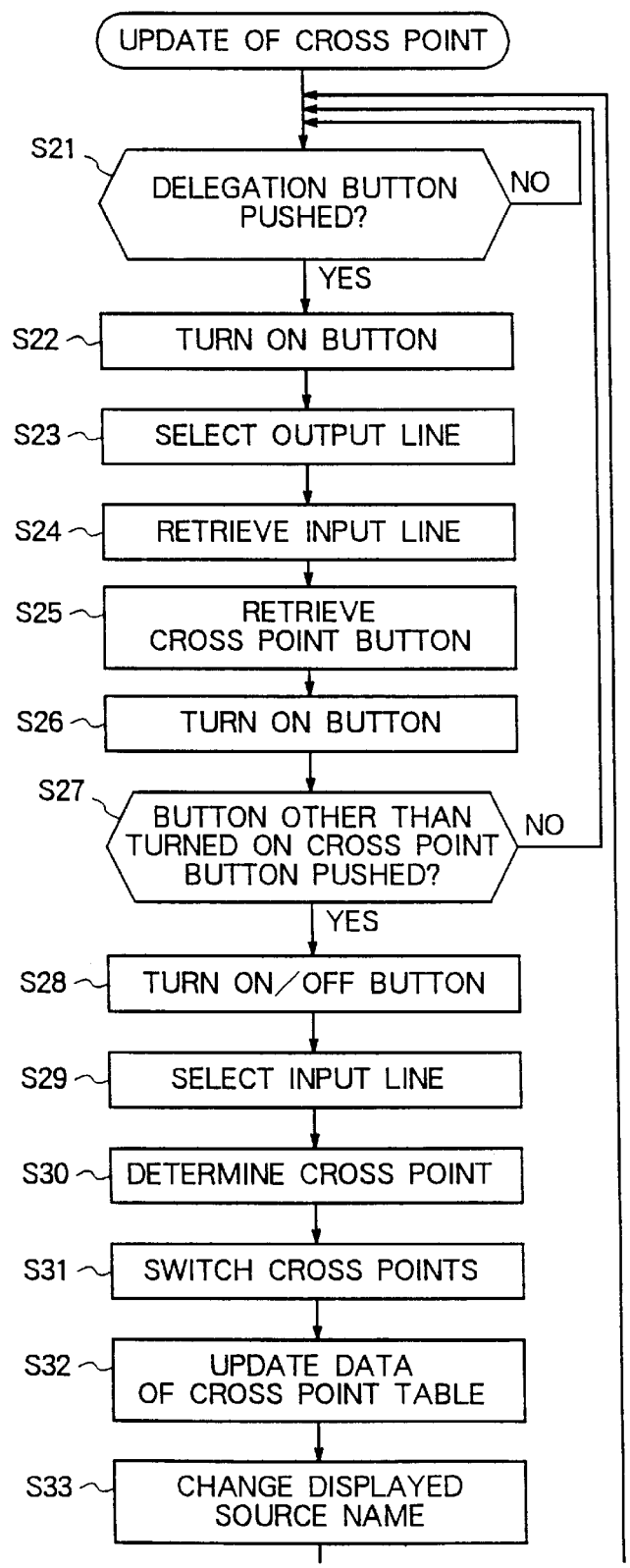
FIG. 15 is a flowchart of the operation for changing a cross point in the matrix switcher of the present invention.

An explanation will be made next of the operation of this matrix switcher by referring to the flowcharts of FIG. 13, FIG. 14, and FIG. 15.

First, an explanation will be made of the set up of the control panel 2 and the panel control block 2c by referring to FIG. 13.

At step S1, the CPU 201 determines whether or not a cross point allocation table is to be newly prepared based on an instruction from the operator. In the case of YES, the routine proceeds to step S2, and in the case of NO, the routine proceeds to step S3.

At step S2, the CPU 201 newly prepares a cross point button allocation table in accordance with the operation of the operator. Concretely, the CPU 201 controls the display controller 209 so as to display the data in the form of a table as shown in FIG. 10 with respect to the display provided in the display unit 80 of the control panel 2. At this time, the data displayed on the display is the number data from 1 to 29 of the primary input lines, and the data indicating the identification numbers of the cross point buttons is not displayed, but is blank as it is. Next, the operator operates the cursor and tenkeys provided beside the display so as to newly input the desired cross point button numbers. The CPU 201 receives the data indicating the identification numbers of the newly input cross point buttons via the display controller 209 to prepare the cross point button allocation table as shown in FIG. 10. In the last of this step S3, the CPU 201 stores the newly prepared cross point allocation table in a predetermined area of the EEPROM 203.

At step S3, the CPU 201 determines whether or not the source name table is to be newly prepared based on an instruction from the operator. In the case of YES, the routine proceeds to step S4, and in the case of NO, the routine proceeds to step S5.

At step S4, the CPU 201 newly prepares a source name table in accordance with the operation of the operator. Concretely, the CPU 201 controls the display controller 209 so as to display the data in the form of a table and keyboard as shown in FIG. 11 with respect to the display provided in the display unit 80 of the control panel 2. At this time, the data displayed on the display is only the numerical data from 1 to 29 of the primary input lines. The source names are not displayed and are left blank. Next, the operator newly inputs the desired source names by operating the cursor and tenkeys provided near the display. The CPU 201 receives the newly input source names via the display controller 209 to prepare the source name table as shown in FIG. 11. In the last of this step S4, the CPU 201 stores the newly prepared source name table in the predetermined area of the EEPROM 203.

At step S5, the CPU 201 decides whether or not to use a cross point button allocation table and source name table already stored in the EEPROM 203 based on the operation of the operator.

By passing the above step S1 to step S5, in the EEPROM 203, the cross point button allocation table and source name table having the desired set up data of the operator are stored.

Next, an explanation will be made of a case where a cross point is newly set up by referring to the flowchart of FIG. 14.

First, at step S11, the CPU 201 decides whether or not the delegation buttons 451A to 463A were pushed in accordance with commands from the button use controller 207. The CPU 201 proceeds to step S12 when it is detected that any button among the 13 delegation buttons 451A to 463A was pushed. Here, for an easier understanding of the later explanation, according to the example shown in FIG. 8, it is assumed that the seventh delegation button 457A among the 13 delegation buttons was pushed by the operator at this step S11.

At step S12, the button use controller 207 causes emission of the LED provided inside this pushed delegation button so as to light up the delegation button pushed at step S11.

At step S13, the CPU 201 selects the output line corresponding to the delegation button selected at step S11 from among the 13 output lines AUX1 to AUX13. Namely, since the seventh delegation button 457A was pushed at step S11, the CPU 201 selects the seventh output line AUX7 from among the 13 output lines AUX1 to AUX13.

At step S14, the CPU 201 decides whether or not the cross point buttons 401A to 429A were pushed in accordance with a detection signal from the button use controller 207. When detecting that any button among the 29 cross point buttons 401A to 429A was pushed, the CPU 201 proceeds to step S14. For the explanation of this step, according to the example shown in FIG. 8, it is assumed that the sixth cross point button 406A among the 29 cross point buttons was pushed by the operator at this step S14.

At step S15, the button use controller 207 causes emission of the LED provided inside this pushed cross point button so as to light up the cross point button pushed at step S13.

At step S16, the CPU 201 refers to the cross point button allocation table stored in the EEPROM 203 and selects the input line allocated to the cross point button selected at step S14 from among the 29 input lines Prm1 to Prm29. Concretely, referring to the data of EEPROM 203 shown in FIG. 9, the input line allocated to the sixth cross point button is the sixth input line Prm6, so the CPU 201 selects the sixth input line at this step S16.

At step S17, the CPU 201 determines the cross point which should be switched based on the output line and input line selected at step S13 and step S16. Concretely, referring to FIG. 8, the seventh output line AUX7 has been already selected in the processing of step S13, and the sixth input line Prm6 has been already selected at step S16, therefore the CPU 201 can determine that the cross point for connecting the seventh output line AUX7 and the sixth input line Prm6 is the cross point 406a-7.

At step S18, the CPU 201 transmits the control command via the communication CPU 205 to the processor 1 so as to switch the cross point 406a-7 selected by the processing of step S17 from the disconnection state (OFF) to the connection state (ON).

On the other hand, the CPU 101 of the processor receiving this control command controls the cross point 406a-7 from the disconnection state (OFF) to the connection state (ON).

At step S19, the CPU 201 updates the data of the cross point table stored in the RAM 204. Concretely, by the processing at step S14, the cross point 406a-7 changes from the disconnection state (OFF) to the connection state (ON), therefore the data indicating the connection state of the cross point 406a-7 in the cross point table is switched from "0" to "1".

At step S20, the CPU 201 controls the LED controller 208 so as to display the letters "VTR3" on the seventh name display unit 457N of the output source name display unit 45N.

By the above step S11 to step S20, the set up of one cross point is ended. Where a plurality of cross points are to be set up, this loop of from step S11 to S20 may be repeated.

Next, an explanation will be made of a case where an already set up cross point is changed to a different cross point by referring to the flowchart of FIG. 14.

For an easy understanding of the flowchart, a specific example will be presented. In the example shown in FIG. 8, the signal from the third video tape recorder VTR3 is supplied to the seventh output line AUX7 connected to the second disc recorder. The flowchart of FIG. 14 will be explained by taking as a concrete example a case where the cross point is switched from an initial state shown in FIG. 8 so that the signal from the second video camera CAM2 is output to the seventh output line AUX7.

First, at step S21, the CPU 201 decides whether or not the delegation buttons 451A to 463A were pushed in accordance with the command from the button use controller 207. When detecting that any button among the 13 delegation buttons 451A to 463A was pushed, the CPU 201 proceeds to step S12. In the above concrete example, the signal to be output to the seventh output line AUX7 must be switched from the signal of the third video tape recorder VTR3 to the signal of the second video camera, therefore, at this step, the operator will push the seventh delegation button 457A.

At step S22, the button use controller 207 causes emission of the LED provided inside this pushed delegation button 457A so as to light up the delegation button 457A pushed at step S11.

At step S23, the CPU 201 selects the output line corresponding to the delegation button selected at step S21 from among the 13 output lines AUX1 to AUX13. Namely, since the seventh delegation button 457A was pushed at step S21, the CPU 201 selects the seventh output line AUX7 from among the 13 output lines AUX1 to AUX13.

At step S24, the CPU 201 retrieves the input line crossing with the seventh output line AUX7 selected at step S23. Concretely, the CPU 201 selects the input line crossing with the seventh output line AUX from among the 29 input lines Prm1 to Prm29 by referring to the data of cross points stored in the cross point table of the RAM 204. In this example, the input line crossing with the seventh output line AUX7 is the sixth input line Prm6, therefore, at this step, the CPU 201 selects the sixth input line Prm6.

Further, at this step S24, the CPU 201 recognizes that the cross point circuit in which the seventh output line AUX and the sixth input line Prm7 cross is the cross point 406a-7 in the matrix portion 104 by referring to the data of the cross points stored in the cross point table of the RAM 204.

At step S25, the CPU 201 retrieves the cross point button corresponding to the input line selected in the processing of step S24. Concretely, the CPU 201 selects the cross point button allocated to the sixth input line Prm6 by referring to the cross point button allocation table of the EEPROM 203. In this example, the cross point corresponding to the sixth input line Prm6 is the sixth cross point button 406A. Accordingly, the CPU 201 selects the sixth cross point button 406A as the cross point button corresponding to the input line to which the signal output to the seventh output line is supplied.

At step S26, the CPU 201 controls the button use controller 207 so as to cause emission of the LED of the sixth cross point button 406A selected at step S25 and light up the button 406A.

At step S27, the CPU 201 decides whether or not a cross point button other than the turned on cross point button was pushed in accordance with a detection signal from the button use controller 207. That is, in this example, it is decided whether or not the cross point buttons 401A to 405A and 407A to 429A other than the sixth cross point button 406A turned on by the processing of step S25 and step S26 were pushed. Note that, in the above concrete example, the signal to be output to the seventh output line AUX7 must be switched from the signal of the third video tape recorder VTR3 to the signal of the second video camera, therefore, at this step S27, the operator will push the second cross point button 402A.

At step S28, the button use controller 207 causes emission of the LED provided inside this pushed cross point button so as to light up the cross point button 402A pushed at step S27. Further, it turns off the cross point button 406A which had been turned on heretofore.

At step S29, the CPU 201 selects the input line allocated to the cross point button 402A selected at step S27 from among the 29 input lines Prm1 to Prm29 by referring to the cross point button allocation table stored in the EEPROM 203. Concretely, referring to the data of the EEPROM 203 shown in FIG. 9, since the input line allocated to the second cross point button is the second input line Prm2, the CPU 201 selects the second input line at this step S29.

At step S30, the CPU 201 determines the cross point which should be switched based on the output line and the input line selected at step S23 and step S29. Specifically, since the seventh output line AUX7 has been already selected in the processing of step S23, and the second input line Prm2 has been already selected at step S29, the CPU 201 can determine that the cross point for connecting the seventh output line AUX7 and the second input line Prm2 is the cross point 402*a*-7.

At step S31, the CPU 201 transmits the control command to the processor 1 via the communication CPU 205 so as to switch the cross point 406*a*-7 which was selected by the processing of step S24 and has been connected from the connection state (ON) to the disconnection state (OFF) and, at the same time, switch the cross point 402*a*-7 selected by the processing of step S30 from the disconnection state (OFF) to the connection state (ON).

On the other hand, the CPU 101 of the processor receiving this control command switches the cross point 406*a*-7 from the connection state (ON) to the disconnection state (OFF) and, at the same time, controls the cross point 402*a*-7 from the disconnection state (OFF) to the connection state (ON).

At step S32, the CPU 201 updates the data of the cross point table stored in the RAM 204. Concretely, by the processing of step S31, the cross point 406*a*-7 switches from the connection state (ON) to the disconnection state (OFF), and the cross point 402*a*-7 switches from the disconnection state (OFF) to the connection state (ON), therefore the CPU 201 changes the data indicating the connection state of the cross point 406*a*-7 in the cross point table from "1" to "0" and, at the same time, changes the data indicating the connection state of the cross point 402*a*-7 from "0" to "1".

At step S33, the CPU 201 controls the LED controller 208 so as to display the letters "CAM2" in place of the letters "VTR3" on the seventh name display unit 457A of the output source name display unit 45N.

By above step S21 to step S33, the processing for changing one cross point is ended. Where changing a plurality of cross points, this loop of from step S21 to step S33 may be repeated.

As in the above explanation, the matrix switcher according to the present invention is a matrix switcher for switching cross points generated by crossing of a plurality of input lines and a plurality of output lines and is provided with a plurality of cross point buttons for selecting desired input lines from the plurality of input lines, a control panel having a plurality of delegation buttons for selecting the desired output lines from the plurality of output lines, and a panel controlling means for displaying source names given to the source signals supplied to the input lines in a predetermined name display portion and, at the same time, displaying the source names given to the source signals output from the output lines via the cross points in the predetermined name display portion.

Accordingly, source names given in advance to signals to be output to the output lines are displayed on the name display unit of the control panel in correspondence to the delegation buttons indicating the output lines, therefore the operator can visually directly grasp the devices to which the source signals are to be supplied.

Further, the matrix switcher of the present invention has a cross point allocation table for storing allocation data to be allocated to a plurality of cross point buttons with respect to a plurality of input lines and a source name table for storing source names individually given to source signals supplied to a plurality of input lines.

Accordingly, a plurality of input lines can be freely allocated to a plurality of cross point buttons. Further, any source name can be given to a source input signal. Further, in the matrix switcher of the present invention, the cross point allocation table and the source name table are stored in a nonvolatile memory, therefore, even after turning off the power supply of the switcher, the data of this table can be re-used.

Further, the matrix switcher of the present invention has a cross point table for storing the cross point information indicating the connection/disconnection state of all cross points in the matrix portion inside a processor. Accordingly, the panel controlling means can always grasp the connection/disconnection state of the cross points of the matrix portion and can carry out high speed control with respect to the control panel.

Further, in the matrix switcher of the present invention, an input line connected to the output line corresponding to the delegation is selected based on the information of the cross point table, and a source name given to the source signal to be supplied to the selected input line is displayed based on the source name table.

Further, in the matrix switcher of the present invention, one output line is selected from among a plurality of output lines in response to the operation of an operation button among a plurality of delegation buttons, and then one input line is selected from among a plurality of input lines in response to the operation of an operation button among a plurality of cross point buttons so as to select one cross point from among a plurality of cross points of the matrix portion.

Accordingly, the cross point can be reliably selected by a small number of operation buttons on the control panel.

Further, the matrix switcher of the present invention carries out a first processing of selecting one output line from among a plurality of output lines in response to a button selected by an operator from among delegation buttons, a second processing of selecting an input line already connected to the output line selected in the first processing from among a plurality of such input lines based on the information of a cross point table and, at the same time, selecting a cross point set with respect to the output line selected in the first processing from among a plurality of such cross points in the processor, a third processing of selecting a cross point button allocated to the input line selected in the second processing from among a plurality of such cross point buttons based on a cross point button allocation table, and a fourth processing for turning on the cross point button selected in the third processing. Accordingly, when the operator operates the delegation button, the cross point button set in correspondence to the input line connected to the output line in correspondence to that delegation button can be automatically turned on.

Further, the matrix switcher of the present invention carries out a fifth processing of detecting whether or not a button other than the cross point button turned on in the fourth processing is selected by the operation of the operator, a sixth processing of selecting the input line corresponding to the first operation button selected in the fifth processing from among a plurality of such input lines based on the cross point button allocation table, a seventh processing of selecting one cross point as the cross point which should be connected from among a plurality of cross points in accordance with the output line selected in the first processing and the input line selected in the sixth processing, and an eighth processing of transmitting a control command for switching the cross point selected in the second processing from the connection state to the disconnection state and a control command for switching the cross point selected in the seventh processing from the disconnection state to the connection state to the processor. Accordingly, just by operating the delegation button and cross point button, the cross points can be automatically switched and, at the same time, the handling of the button operation is improved.

Further, the matrix switcher of the present invention carries out a ninth processing of retrieving the source name given to the input line selected in the sixth processing based on the name data of the source name table, and a 10th processing of newly displaying the source name retrieved in the ninth processing on the name display portion corresponding to the output line selected in the first processing in place of the source name which has been already displayed. Accordingly, when switching the cross point, the name to be automatically displayed is changed in accordance with the switching.

INDUSTRIAL APPLICABILITY

The matrix switcher of the present invention can be applied to a switcher system for selecting a desired source video data from among video data input from a plurality of input lines, switching the output line to a desired output line, and outputting the same in a broadcasting station etc.

We claim:

1. A matrix switcher for switching cross points generated by crossing between a plurality of input lines and a plurality of output lines, comprising:
   a plurality of first operation buttons for selecting desired input lines from among said plurality of input lines;
   a plurality of first display units for displaying source names given to source signals at positions individually set in correspondence to said plurality of first operation buttons;
   a plurality of second operation buttons for selecting desired output lines from among said plurality of output lines;
   a plurality of second display units for displaying said source names given to said source signals at positions individually set in correspondence to said plurality of second operation buttons; and
   a controlling means for displaying said source names given to said source signals supplied to said input lines on said first display units and displaying said source names given to said source signals to be output from said output lines via said cross points on said second display units.

2. A matrix switcher as set forth in claim 1, comprising:
   a control panel provided with said plurality of first operation buttons, said plurality of first display units, said plurality of second operation buttons, and said plurality of second display units;
   a panel control block comprising said controlling means;
   a matrix unit in which said plurality of input lines and said plurality of output lines cross in the form of matrix; and
   a processor comprising a switching controlling means for controlling the switching of the cross points in said matrix unit.

3. A matrix switcher as set forth in claim 1, wherein
   said controlling means comprises a storing means for storing allocation data for allocating said plurality of input lines to said first operation buttons.

4. A matrix switcher as set forth in claim 1, wherein
   said controlling means comprises a storing means for storing name data given to signals to be supplied to said plurality of input lines.

5. A matrix switcher as set forth in claim 2, further comprising
   a first storing means for storing allocation data for allocating said plurality of input lines to said first operation buttons and storing source names individually given to source signals to be supplied to said plurality of input lines.

6. A matrix switcher as set forth in claim 5, wherein
   said controlling means stores the allocation data indicating operation buttons individually allocated to said plurality of input lines in said first storing means as a first table and stores source names individually given to said plurality of input lines in said first storing means as a second table.

7. A matrix switcher as set forth in claim 6, wherein
   said first storing means is a nonvolatile memory.

8. A matrix switcher as set forth in claim 6, further comprising
   a second storing means for storing cross point information indicating a connection/disconnection state of all cross points in the matrix unit of said processor.

9. A matrix switcher as set forth in claim 8, wherein
   said controlling means stores said cross point information in said second storing means as a third table.

10. A matrix switcher as set forth in claim 9, wherein
    said controlling means displays source names given to signals to be output from said output lines on said second display units based on the name data of the second table stored in said first storing means and the cross point information of the third table stored in said second storing means.

11. A matrix switcher as set forth in claim 9, wherein
    said controlling means selects one of said input lines connected to an output line corresponding to said second operation button based on cross point information of the third table stored in said second storing means and displays one of said source names given to one of said source
    said controlling means selects one of said input lines connected to an output line corresponding to said second operation button based on cross point information of the third table stored in said second storing means and displays one of said source names given to one of said source signals to be supplied to said selected input line on said second display unit corresponding to said second operation button based on name data of the second table stored in said first storing means.

12. A matrix switcher as set forth in claim 9, wherein
    said controlling means selects one cross point as the cross point which should be connected from among a plurality of cross points of the matrix unit in response to the operation of said first operation button and said second operation button and transmits a control command for switching this selected cross point from the disconnection state to the connection state to said processor and the switching controlling means of said processor switches said selected cross point from the disconnection state to the connection state in accordance with the control command transmitted from said controlling means.

13. A matrix switcher as set forth in claim 12, wherein said controlling means selects one output line from among said plurality of output lines in response to the operation of an operation button among said plurality of second operation buttons and then selects one input line from among said plurality of input lines in response to the operation of an operation button among said plurality of first operation buttons so as to select one cross point from among a plurality of cross points of said matrix unit.

14. A matrix switcher as set forth in claim 11, wherein said controlling means retrieves an output line corresponding to an operated second operation button when detecting that one operation button among said plurality of second operation buttons is operated by an operator and turns on the first operation button set in correspondence to an input line connected to this retrieved output line.

15. A matrix switcher as set forth in claim 11, wherein said controlling means carries out at least:

a first processing of selecting one output line from among said plurality of output lines in response to the operation button selected by an operator among said plurality of second operation buttons;

a second processing of selecting one of said input line already connected to said selected output line from among said plurality of input lines based on the cross point information of the third table stored in said second storing means;

a third processing of selecting the operation button allocated to the one input line selected in said second processing from among said plurality of first operation buttons based on the allocation data of the first table stored in said first storing means; and a fourth processing of turning on the first button selected in said third processing.

16. A matrix switcher as set forth in claim 15, wherein said controlling means further carries out at least:

a fifth processing of detecting whether or not an operation button other than the first operation button turned on in said fourth processing is selected by the operation of the operator;

a sixth processing of selecting an input line corresponding to the first operation button selected in said fifth processing from among said plurality of input lines based on the data of said operation button allocation table;

a seventh processing of determining the cross point inside said processor in accordance with the one output line selected in said first processing and the input line selected in said sixth processing; and an eighth processing of transmitting a control command for controlling the cross point determined in said seventh processing from the disconnection state to the connection state to said processor.

17. A matrix switcher as set forth in claim 16, wherein the switching controlling means of said processor switches the cross point determined in said seventh processing from the disconnection state to the connection state based on said control command transmitted from said controlling means.

18. A matrix switcher as set forth in claim 11, wherein said controlling means carries out at least:

a first processing of selecting one output line from among said plurality of output lines in response to the operation button selected by an operator among said plurality of second operation buttons;

a second processing of selecting the input line already connected to the output line selected in said first processing from among said plurality of input lines based on the cross point information of the third table stored in said second storing means and selecting the cross point set up with respect to the output line selected in said first processing from among a plurality of cross points in the processor;

a third processing of selecting the operation button allocated to the input line selected in said second processing from among said plurality of first operation buttons based on the allocation data of the first table stored in said first storing means;

a fourth processing of turning on the first button selected in said third processing;

a fifth processing of detecting whether or not the operation button other than the first operation button turned on in said fourth processing is selected by the operation of the operator;

a sixth processing of selecting the input line corresponding to the first operation button selected in said fifth processing from among said plurality of input lines based on the data of said operation button allocation table;

a seventh processing of selecting one cross point from among the plurality of cross points inside said processor as the cross point which should be connected in accordance with the output line selected in said first processing and the input line selected in said sixth processing; and an eighth processing of transmitting a first control command for switching the cross point selected in said second processing from the connection state to the disconnection state and a second control command for switching the cross point selected in said seventh processing from the disconnection state to the connection state to said processor.

19. A matrix switcher as set forth in claim 18, wherein said controlling means updates cross point information representing the connection state of the cross point selected in said second processing stored in said second storing means and cross point information representing the connection state of the cross point selected in said seventh processing to new cross point information.

20. A matrix switcher as set forth in claim 15, wherein said controlling means carries out:

a fifth processing of detecting whether or not an operation button other than the first operation button turned on in said fourth processing is selected by the operation of the operator;

a sixth processing of selecting the input line corresponding to the first operation button selected in said fifth processing from among said plurality of input lines based on the data of said operation button allocation table;

a ninth processing of retrieving the source name given to the input line selected in said sixth processing based on the name data of the second table stored in said storing means; and a 10th processing of newly displaying the source name retrieved in said ninth processing on the second display unit corresponding to the output line selected in said first processing in place of the already displayed source name.

21. A matrix switcher as set forth in claim 11, wherein said controlling means carries out:

a first processing of selecting one output line from among said plurality of output lines in response to the operation button selected by the operator among said plurality of second operation buttons;

a second processing of selecting the input line already connected to the output line selected in said first processing from among a plurality of input lines based on the cross point information of the third table stored in said second storing means and selecting the cross point set up with respect to the output line selected in said first processing from among a plurality of cross points in the processor;

a third processing of selecting the operation button allocated to the input line selected in said second processing from among said plurality of first operation buttons based on the allocation data of the first table stored in said first storing means;

a fourth processing of turning on the first button selected in said third processing;

a fifth processing of detecting whether or not the operation button other than the first operation button turned on in said fourth processing is selected by the operation of the operator;

a sixth processing of selecting the input line corresponding to the first operation button selected in said fifth processing from among said plurality of input lines based on the data of said operation button allocation table;

a seventh processing of selecting one cross point from among the plurality of cross points inside said processor as the cross point which should be connected in accordance with the output line selected in said first processing and the input line selected in said sixth processing;

an eighth processing of transmitting a first control command for switching the cross point selected in said second processing from the connection state to the disconnection state and a second control command for switching the cross point selected in said seventh processing from the disconnection state to the connection state to said processor;

a ninth processing of retrieving the source name given to the input line selected in said sixth processing based on the name data of the second table stored in said first storing means; and a 10th processing of newly displaying the source name retrieved in said ninth processing on the second display unit corresponding to the output line selected in said first processing in place of the already displayed source name.

22. A matrix switcher as set forth in claim 21, wherein said controlling means updates cross point information representing the connection state of a cross point selected in said second processing stored in said second storing means and the cross point information representing the connection state of the cross point selected in said seventh processing to new cross point information.

23. A matrix switcher as set forth in claim 9, wherein said processor comprises a plurality of mix/effect circuits for applying an effect with respect to supplied source signals and mixing the supplied plurality of source signals and said control panel comprises a third operation button for selecting source signals to be supplied to said plurality of mix/effect circuits and a third display unit for displaying the source names given to said source signals at the position set in correspondence to said third operation button.

24. A matrix switcher as set forth in claim 23, wherein said controlling means allocates the same input line with respect to said first operation button and said third operation button based on the first table stored in said first storing means and displays the same source name on said first display unit and said third display unit based on the second table stored in said first storing means.

* * * * *